US010195542B2

(12) United States Patent
Swaminathan et al.

(10) Patent No.: US 10,195,542 B2
(45) Date of Patent: *Feb. 5, 2019

(54) SURFACE MODIFIED FILTER MEDIA

(71) Applicant: Hollingsworth & Vose Company, East Walpole, MA (US)

(72) Inventors: Sneha Swaminathan, Nashua, NH (US); Howard Yu, Belmont, MA (US)

(73) Assignee: Hollingsworth & Vose Company, East Walpole, MA (US)

( * ) Notice: Subject to any disclaimer, the term of this patent is extended or adjusted under 35 U.S.C. 154(b) by 568 days.

This patent is subject to a terminal disclaimer.

(21) Appl. No.: 14/279,190

(22) Filed: May 15, 2014

(65) Prior Publication Data

US 2015/0328565 A1 Nov. 19, 2015

(51) Int. Cl.
*B01D 17/04* (2006.01)
*B01D 39/16* (2006.01)

(52) U.S. Cl.
CPC ....... *B01D 17/045* (2013.01); *B01D 39/1623* (2013.01); *B01D 2239/0421* (2013.01); *B01D 2239/0428* (2013.01); *B01D 2239/065* (2013.01)

(58) Field of Classification Search
CPC ...... B01D 46/03; B01D 46/06; B01D 46/546; B01D 39/83; B01D 39/86; B01D 39/163;
(Continued)

(56) References Cited

U.S. PATENT DOCUMENTS

| 3,645,398 A | 2/1972 | Fiocco |
| 3,847,821 A | 11/1974 | Krueger |

(Continued)

FOREIGN PATENT DOCUMENTS

| CN | 1016355 B | 4/1992 |
| CN | 2393623 Y | 8/2000 |

(Continued)

OTHER PUBLICATIONS

International Search Report and Written Opinion for PCT/US2014/017979 dated May 21, 2014.
(Continued)

*Primary Examiner* — Jason M Greene
(74) *Attorney, Agent, or Firm* — Wolf, Greenfield & Sacks, P.C.

(57) ABSTRACT

Surface modified filter media, including surface modified filter media having enhanced performance characteristics, are provided. In some embodiments, a filter media may comprise two or more layers designed to enhance fluid separation efficiency. One or more of the layers may have at least a portion of a surface that is modified to alter and/or enhance the wettability of the surface with respect to a particular fluid. In certain embodiments involving a filter media including more than one surface modified layer, at least one surface modified layer may have a greater air permeability and/or mean flow pore size than that of another surface modified layer. Such a configuration of layers may result in the media having enhanced fluid separation properties compared to filter media that do not include such modified layers or configuration of layers, all other factors being equal. The filter media may be well-suited for a variety of applications, including filtering fuel, air, and lube oil.

22 Claims, 12 Drawing Sheets

(58) Field of Classification Search
CPC .......... B01D 39/1623; B01D 39/1692; B01D 39/2017; B01D 39/2055; B01D 39/2065; B01D 17/045; B01D 39/1607; B01D 39/1615; B01D 2239/0421; B01D 2239/0428; B01D 2239/065; B01D 2275/10
USPC .............. 55/486, 487, 488; 96/154; 95/273; 210/259, 348, 446, 483, 489, 491, 493.1, 210/500.1, 505, 508, 634, 497.1
See application file for complete search history.

(56) References Cited

U.S. PATENT DOCUMENTS

| | | | |
|---|---|---|---|
| 3,865,732 A | 2/1975 | Terhune et al. | |
| 3,943,063 A | 3/1976 | Morishita et al. | |
| 3,951,814 A | 4/1976 | Krueger | |
| 4,199,447 A | 4/1980 | Chambers et al. | |
| 4,468,428 A * | 8/1984 | Early | A61L 15/18 427/397.7 |
| 4,501,785 A | 2/1985 | Nakanishi | |
| 4,588,500 A | 5/1986 | Sprenger et al. | |
| 4,604,205 A | 8/1986 | Ayers | |
| 4,618,388 A | 10/1986 | Ayers | |
| 4,623,560 A | 11/1986 | Ayers | |
| 4,650,506 A | 3/1987 | Barris et al. | |
| 4,888,117 A | 12/1989 | Brown et al. | |
| 4,892,667 A | 1/1990 | Parker, III et al. | |
| 4,921,612 A | 5/1990 | Sirkar | |
| 4,995,974 A | 2/1991 | Lorey et al. | |
| 5,053,132 A | 10/1991 | Sirkar | |
| 5,156,905 A | 10/1992 | Bagrodia et al. | |
| 5,269,925 A | 12/1993 | Broadhurst | |
| 5,275,859 A | 1/1994 | Phillips et al. | |
| 5,294,338 A | 3/1994 | Kamo et al. | |
| 5,356,704 A | 10/1994 | Phillips et al. | |
| 5,443,724 A | 8/1995 | Williamson et al. | |
| 5,480,547 A | 1/1996 | Williamson et al. | |
| 5,503,746 A | 4/1996 | Gagnon | |
| 5,547,756 A | 8/1996 | Kamo et al. | |
| 5,580,459 A | 12/1996 | Powers et al. | |
| 5,580,692 A | 12/1996 | Lofftus et al. | |
| 5,629,367 A | 5/1997 | Lofftus et al. | |
| 5,672,399 A | 9/1997 | Kahlbaugh et al. | |
| 5,785,725 A | 7/1998 | Cusick et al. | |
| 6,123,752 A | 9/2000 | Wu et al. | |
| 6,171,684 B1 | 1/2001 | Kahlbaugh et al. | |
| 6,224,768 B1 | 5/2001 | Navarre et al. | |
| 6,352,947 B1 | 3/2002 | Haley et al. | |
| 6,395,184 B1 | 5/2002 | Bukhtiyarov et al. | |
| 6,422,395 B1 | 7/2002 | Verdegan et al. | |
| 6,422,396 B1 | 7/2002 | Li et al. | |
| 6,537,614 B1 | 3/2003 | Wei et al. | |
| 6,554,881 B1 | 4/2003 | Healey | |
| 6,569,330 B1 | 5/2003 | Sprenger et al. | |
| 6,616,723 B2 | 9/2003 | Berger | |
| 6,696,373 B2 | 2/2004 | Kinn et al. | |
| 6,743,273 B2 | 6/2004 | Chung et al. | |
| 6,802,315 B2 | 10/2004 | Gahan et al. | |
| 6,855,173 B2 | 2/2005 | Ehrnsperger et al. | |
| 6,914,040 B2 | 7/2005 | Deak et al. | |
| 6,924,028 B2 | 8/2005 | Chung et al. | |
| 6,942,711 B2 | 9/2005 | Faulkner et al. | |
| 6,955,775 B2 | 10/2005 | Chung et al. | |
| 7,008,465 B2 | 3/2006 | Graham et al. | |
| 7,070,640 B2 | 7/2006 | Chung et al. | |
| 7,084,099 B2 | 8/2006 | Radomyselski et al. | |
| 7,090,715 B2 | 8/2006 | Chung et al. | |
| 7,137,510 B1 | 11/2006 | Klein et al. | |
| 7,179,317 B2 | 2/2007 | Chung et al. | |
| 7,241,728 B2 | 7/2007 | Radomyselski et al. | |
| 7,244,291 B2 | 7/2007 | Spartz et al. | |
| 7,258,797 B2 | 8/2007 | Burton et al. | |
| 7,270,693 B2 | 9/2007 | Chung et al. | |
| 7,309,372 B2 | 12/2007 | Kahlbaugh et al. | |
| 7,314,497 B2 | 1/2008 | Kahlbaugh et al. | |
| 7,316,723 B2 | 1/2008 | Chung et al. | |
| 7,318,852 B2 | 1/2008 | Chung et al. | |
| 7,318,853 B2 | 1/2008 | Chung et al. | |
| 7,326,272 B2 | 2/2008 | Hornfeck et al. | |
| 7,413,657 B1 | 8/2008 | Thundyil et al. | |
| 7,527,739 B2 | 5/2009 | Jiang et al. | |
| 7,584,860 B2 | 9/2009 | Olson | |
| 7,754,123 B2 | 7/2010 | Verdegan et al. | |
| 7,824,550 B2 | 11/2010 | Abreu et al. | |
| 7,887,704 B2 | 2/2011 | Jiang et al. | |
| 7,938,963 B2 | 5/2011 | Klein et al. | |
| 7,985,344 B2 | 7/2011 | Dema et al. | |
| 7,987,996 B2 | 8/2011 | Ohashi et al. | |
| 7,988,860 B2 | 8/2011 | Kalayci et al. | |
| 8,017,011 B2 | 9/2011 | Ellis et al. | |
| 8,021,455 B2 | 9/2011 | Adamek et al. | |
| 8,021,457 B2 | 9/2011 | Dema et al. | |
| 8,029,588 B2 | 10/2011 | Chung et al. | |
| 8,057,567 B2 | 11/2011 | Webb et al. | |
| 8,114,183 B2 | 2/2012 | Schwandt et al. | |
| 8,118,901 B2 | 2/2012 | Chung et al. | |
| 8,118,910 B2 | 2/2012 | Farzana et al. | |
| 8,172,092 B2 * | 5/2012 | Green | B01D 39/1623 156/166 |
| 8,177,984 B2 | 5/2012 | Stanfel et al. | |
| 8,263,214 B2 | 9/2012 | Kalayci et al. | |
| 8,268,033 B2 | 9/2012 | Rogers et al. | |
| 8,277,529 B2 | 10/2012 | Rogers et al. | |
| 8,360,251 B2 | 1/2013 | Wieczorek et al. | |
| 8,366,797 B2 | 2/2013 | Chung et al. | |
| 8,517,185 B2 | 8/2013 | Wieczorek et al. | |
| 8,535,404 B2 | 9/2013 | Crabtree et al. | |
| 8,636,833 B2 | 1/2014 | Jones et al. | |
| 9,149,748 B2 | 10/2015 | Nagy et al. | |
| 9,149,749 B2 | 10/2015 | Nagy et al. | |
| 2002/0056684 A1 | 5/2002 | Klein | |
| 2002/0073849 A1 | 6/2002 | Buettner et al. | |
| 2003/0203696 A1 | 10/2003 | Healey | |
| 2005/0026526 A1 | 2/2005 | Verdegan et al. | |
| 2006/0117730 A1 | 6/2006 | Chung et al. | |
| 2006/0137318 A1 | 6/2006 | Lim et al. | |
| 2006/0191249 A1 | 8/2006 | Gogins et al. | |
| 2007/0012007 A1 | 1/2007 | Chung et al. | |
| 2007/0039300 A1 | 2/2007 | Kahlbaugh et al. | |
| 2007/0062887 A1 | 3/2007 | Schwandt et al. | |
| 2007/0084776 A1 | 4/2007 | Sasur | |
| 2007/0102372 A1 | 5/2007 | Ferrer et al. | |
| 2007/0271883 A1 | 11/2007 | Chung et al. | |
| 2007/0271891 A1 | 11/2007 | Chung et al. | |
| 2007/0283808 A1 | 12/2007 | Chung et al. | |
| 2008/0033106 A1 * | 2/2008 | Koroskenyi | C08F 293/005 524/801 |
| 2008/0073296 A1 | 3/2008 | Dema et al. | |
| 2008/0110822 A1 | 5/2008 | Chung et al. | |
| 2008/0197070 A1 | 8/2008 | Sirkar et al. | |
| 2008/0202107 A1 * | 8/2008 | Boorse | B01D 53/9418 60/301 |
| 2008/0257153 A1 | 10/2008 | Harp | |
| 2008/0276805 A1 | 11/2008 | Lotgerink | |
| 2008/0314821 A1 | 12/2008 | Ohashi et al. | |
| 2009/0032475 A1 | 2/2009 | Ferrer et al. | |
| 2009/0042072 A1 * | 2/2009 | Vu | H01M 8/04089 429/436 |
| 2009/0044702 A1 | 2/2009 | Adamek et al. | |
| 2009/0050578 A1 | 2/2009 | Israel et al. | |
| 2009/0065436 A1 | 3/2009 | Kalayci et al. | |
| 2009/0134068 A1 | 5/2009 | Falkiner et al. | |
| 2009/0178970 A1 | 7/2009 | Stanfel et al. | |
| 2009/0317621 A1 | 12/2009 | Youngblood et al. | |
| 2010/0006494 A1 | 1/2010 | Scher et al. | |
| 2010/0050871 A1 | 3/2010 | Moy et al. | |
| 2010/0064645 A1 | 3/2010 | Chung et al. | |
| 2010/0116138 A1 | 5/2010 | Guimond et al. | |
| 2010/0116751 A1 | 5/2010 | Bajpai et al. | |
| 2010/0200512 A1 | 8/2010 | Chase et al. | |
| 2010/0206800 A1 | 8/2010 | Veit et al. | |
| 2010/0285101 A1 | 11/2010 | Moore et al. | |
| 2010/0307119 A1 | 12/2010 | Leung et al. | |

(56) References Cited

U.S. PATENT DOCUMENTS

| | | |
|---|---|---|
| 2011/0006017 A1 | 1/2011 | Wieczorek et al. |
| 2011/0067369 A1 | 3/2011 | Chung et al. |
| 2011/0084028 A1 | 4/2011 | Stanfel et al. |
| 2011/0089101 A1 | 4/2011 | Girondi |
| 2011/0124941 A1 | 5/2011 | Verdegan et al. |
| 2011/0138685 A1 | 6/2011 | Kalayci et al. |
| 2011/0147299 A1 | 6/2011 | Stanfel et al. |
| 2011/0168622 A1 | 7/2011 | Lucas |
| 2011/0168647 A1 | 7/2011 | Wieczorek et al. |
| 2011/0198280 A1 | 8/2011 | Jones et al. |
| 2011/0209619 A1 | 9/2011 | Lazarevic et al. |
| 2011/0210061 A1 | 9/2011 | Li et al. |
| 2011/0215046 A1* | 9/2011 | Rogers ............... B01D 39/1615 210/491 |
| 2011/0233152 A1 | 9/2011 | Wieczorek et al. |
| 2011/0238026 A1 | 9/2011 | Zhang et al. |
| 2011/0259796 A1 | 10/2011 | Chen et al. |
| 2011/0259813 A1 | 10/2011 | Wertz et al. |
| 2011/0309012 A1 | 12/2011 | Rogers et al. |
| 2012/0043281 A1 | 2/2012 | Stanfel et al. |
| 2012/0067220 A1 | 3/2012 | Velpari et al. |
| 2012/0067814 A1 | 3/2012 | Guimond et al. |
| 2012/0177888 A1 | 7/2012 | Escafere et al. |
| 2012/0204527 A1 | 8/2012 | Chung et al. |
| 2012/0234748 A1 | 9/2012 | Little et al. |
| 2012/0261330 A1 | 10/2012 | Stanfel et al. |
| 2012/0261358 A1 | 10/2012 | Stanfel et al. |
| 2012/0292252 A1* | 11/2012 | Chase ............... B01D 46/003 210/634 |
| 2012/0312734 A1 | 12/2012 | Kalayci et al. |
| 2012/0312738 A1 | 12/2012 | Rogers et al. |
| 2013/0001154 A1 | 1/2013 | Chung et al. |
| 2013/0001155 A1 | 1/2013 | Neubauer et al. |
| 2013/0008006 A1 | 1/2013 | Israel et al. |
| 2013/0008846 A1 | 1/2013 | Rogers et al. |
| 2013/0008853 A1 | 1/2013 | Dallas et al. |
| 2013/0029048 A1 | 1/2013 | Goscha et al. |
| 2013/0264276 A1 | 10/2013 | Corn et al. |
| 2013/0340613 A1 | 12/2013 | Krupnikov et al. |
| 2013/0341290 A1 | 12/2013 | Yu et al. |
| 2014/0034580 A1 | 2/2014 | Chen |
| 2014/0110354 A1 | 4/2014 | Haberkamp et al. |
| 2014/0130469 A1 | 5/2014 | Nagy et al. |
| 2014/0275692 A1 | 9/2014 | Patel et al. |
| 2014/0331626 A1* | 11/2014 | Nagy ............... B01D 39/1607 55/487 |
| 2016/0002484 A1 | 1/2016 | Geisen et al. |
| 2016/0051919 A1 | 2/2016 | Nagy et al. |
| 2016/0059167 A1 | 3/2016 | Nagy et al. |
| 2016/0136554 A1 | 5/2016 | Swaminathan et al. |
| 2016/0166953 A1 | 6/2016 | Swaminathan et al. |
| 2016/0303498 A1 | 10/2016 | Doucoure et al. |
| 2016/0361674 A1 | 12/2016 | Swaminathan et al. |

FOREIGN PATENT DOCUMENTS

| | | |
|---|---|---|
| CN | 1150445 C | 5/2004 |
| CN | 1954993 A | 5/2007 |
| CN | 101156998 A | 4/2008 |
| CN | 101967390 A | 2/2011 |
| CN | 102046261 A | 5/2011 |
| CN | 102421583 A | 4/2012 |
| CN | 103025404 A | 4/2013 |
| DE | 32 15 161 C1 | 12/1983 |
| DE | 102010031842 A1 | 1/2012 |
| DE | 102010031843 A1 | 1/2012 |
| DE | 102012010307 A1 | 11/2013 |
| EP | 0 203 703 A1 | 12/1986 |
| EP | 1 201 286 A1 | 5/2002 |
| EP | 1 254 697 A2 | 11/2002 |
| EP | 1 194 207 B1 | 8/2004 |
| GB | 1 039 551 A | 8/1966 |
| GB | 1 075 575 A | 7/1967 |
| GB | 1 088 029 A | 10/1967 |
| GB | 1 107 607 A | 3/1968 |
| GB | 1 374 290 A | 11/1974 |
| GB | 1 395 399 A | 5/1975 |
| GB | 1 520 495 A | 8/1978 |
| GB | 2 022 433 A | 12/1979 |
| GB | 2 078 536 A | 1/1982 |
| WO | WO 00/37736 A2 | 6/2000 |
| WO | WO 01/056678 A1 | 8/2001 |
| WO | WO 01/73286 A1 | 10/2001 |
| WO | WO 02/076576 A2 | 10/2002 |
| WO | WO 03/057345 A1 | 7/2003 |
| WO | WO 2005/120689 A2 | 12/2005 |
| WO | WO 2006/101992 A2 | 9/2006 |
| WO | WO 2006/135703 A2 | 12/2006 |
| WO | WO 2007/041559 A2 | 4/2007 |
| WO | WO 2008/058243 A2 | 5/2008 |
| WO | WO 2009/018463 A2 | 2/2009 |
| WO | WO 2009/042641 A2 | 4/2009 |
| WO | WO 2009/095339 A1 | 8/2009 |
| WO | WO 2010/053537 A2 | 5/2010 |
| WO | WO 2011/101750 A1 | 8/2011 |
| WO | WO 2012/069338 A1 | 5/2012 |
| WO | WO 2014/021167 A1 | 2/2014 |
| WO | WO 2014/116946 A1 | 7/2014 |
| WO | WO 2014/143039 A1 * | 9/2014 |
| WO | WO 2015/036862 A1 | 3/2015 |

OTHER PUBLICATIONS

International Preliminary Report on Patentability for PCT/US2014/017979 dated Sep. 3, 2015.
International Search Report and Written Opinion for PCT/US2015/030955 dated Aug. 10, 2015.
International Search Report and Written Opinion for PCT/US2015/030968 dated Jul. 28, 2015.
International Search Report and Written Opinion for PCT/US2015/065749 dated Dec. 15, 2015.
U.S. Appl. No. 14/841,460, filed Aug. 31, 2015, Nagy et al.
U.S. Appl. No. 14/841,487, filed Aug. 31, 2015, Nagy et al.
U.S. Appl. No. 14/690,345, filed Apr. 17, 2015, Doucouré et al.
U.S. Appl. No. 15/168,709, filed May 31, 2016, Boesner.
U.S. Appl. No. 15/178,199, filed Jun. 9, 2016, Swaminathan et al.

* cited by examiner

SURFACE MODIFIED FILTER MEDIA

FIELD OF INVENTION

The present embodiments relate generally to surface modified filter media, and specifically, to surface modified filter media having enhanced performance characteristics.

BACKGROUND

Filter elements can be used to remove contamination in a variety of applications. Such elements can include a filter media which may be formed of a web of fibers. The fiber web provides a porous structure that permits fluid (e.g., gas, liquid) to flow through the media. Contaminant particles (e.g., dust particles, soot particles) contained within the fluid may be trapped on or in the fiber web. Depending on the application, the filter media may be designed to have different performance characteristics (e.g., enhanced fluid separation efficiency, such as fuel/water separation efficiency).

In some applications, filter media may include layers having at least one modified surface. Although many surface modified filter media exist, improvements in the performance characteristics of the layers within the media (e.g., efficiency) would be beneficial.

SUMMARY OF THE INVENTION

Surface modified filter media having enhanced performance characteristics, and related components, systems, and methods associated therewith are provided. The subject matter of this application involves, in some cases, interrelated products, alternative solutions to a particular problem, and/or a plurality of different uses of structures and compositions.

In one embodiment, a filter media is provided. The filter media comprises a non-woven web, comprising a first layer having a hydrophobic surface. The first layer has a basis weight between 0.1 g/m$^2$ and 100 g/m$^2$, a thickness between 0.05 mm and 3 mm, and an air permeability between 0.3 CFM and 800 CFM. The filter media also includes a second layer having a hydrophobic surface. The second layer has a basis weight between 0.1 g/m$^2$ and 100 g/m$^2$, a thickness between 0.05 mm and 3 mm, and an air permeability between 0.3 CFM and 800 CFM, and wherein the air permeability of the second layer is different from an air permeability of the first layer. The filter media also includes a third layer, where a surface of the third layer is coated with a hydrophilic material. The third layer has a basis weight between 0.1 g/m$^2$ and 100 g/m$^2$, a thickness between 0.05 mm and 3 mm, and an air permeability between 0.3 CFM and 800 CFM.

In another embodiment, a filter media comprises a non-woven web comprising a first layer having a hydrophilic surface. The first layer has a basis weight between 0.1 g/m$^2$ and 100 g/m$^2$, a thickness between 0.05 mm and 3 mm, and an air permeability between 0.3 CFM and 800 CFM. The filter media also comprises a second layer having a hydrophilic surface. The second layer has a basis weight between 0.1 g/m$^2$ and 100 g/m$^2$, a thickness between 0.05 mm and 3 mm, and an air permeability between 0.3 CFM and 800 CFM. A surface of at least one of the first and second layers is coated with a hydrophilic material. The air permeability of the second layer is different from the air permeability of the first layer. The filter media also comprises a third layer having a hydrophobic surface. The third layer has a basis weight between 0.1 g/m$^2$ and 100 g/m$^2$, a thickness between 0.05 mm and 3 mm, and an air permeability between 0.3 CFM and 800 CFM.

In another embodiment, a filter media comprises a non-woven web, comprising a first layer comprising a first surface having a first surface roughness. The first layer has a basis weight between 0.1 g/m$^2$ and 100 g/m$^2$, a thickness between 0.05 mm and 3 mm, and an air permeability between 0.3 CFM and 800 CFM. The filter media also includes a second layer comprising a second surface having a second surface roughness, wherein the second surface roughness is greater than the first surface roughness, and wherein the second surface has a contact angle of greater than 90° when measured by ASTM D5946-04. The second layer has a basis weight between 0.1 g/m$^2$ and 100 g/m$^2$, a thickness between 0.05 mm and 3 mm, and an air permeability between 0.3 CFM and 800 CFM.

In another embodiment, a filter media is provided. The filter media comprises a non-woven web comprising a first layer having a hydrophobic surface. The first layer has a basis weight between 0.1 g/m$^2$ and 100 g/m$^2$, a thickness between 0.05 mm and 3 mm, and an air permeability between 0.3 CFM and 800 CFM. The filter media also includes a second layer, wherein a surface of the second layer is coated with a hydrophilic material. The second layer has a basis weight between 0.1 g/m$^2$ and 100 g/m$^2$, a thickness between 0.05 mm and 3 mm, and an air permeability between 0.3 CFM and 800 CFM, and wherein the air permeability of the second layer is different from an air permeability of the first layer.

Filter elements comprising the filter media described above and herein are provided. Methods of filtering fluids (e.g., liquids containing mixtures of fuel-water or other oil-water mixtures or emulsions) using the filter media described above and herein are also provided.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
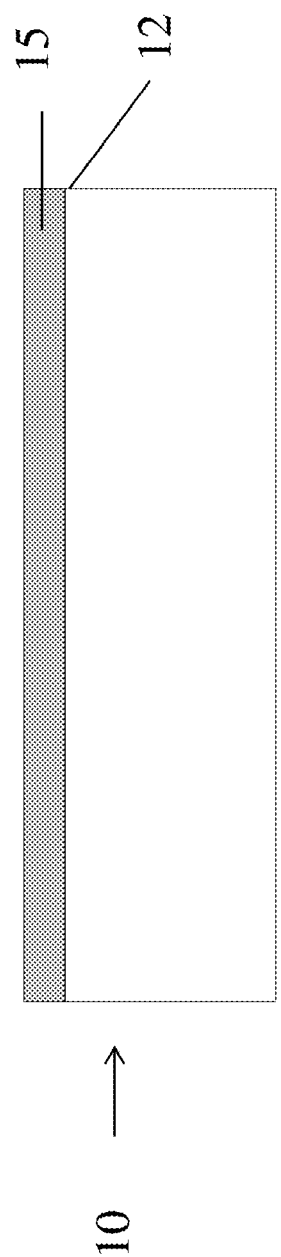
FIGS. 1A-B are (A) a schematic diagram showing a cross-section of a layer of a filter media having a modified surface and (B) a schematic diagram showing a cross-section of a filter media according to one set of embodiments.

Surface modified filter media, including surface modified filter media having enhanced performance characteristics, are provided. In some embodiments, a filter media may comprise two or more layers designed to enhance fluid separation efficiency (e.g., fuel-water separation efficiency). One or more of the layers may have at least a portion of a surface that is modified to alter and/or enhance the wettability of the surface with respect to a particular fluid (e.g., the fluid to be separated). In certain embodiments involving a filter media including more than one surface modified layer, at least one surface modified layer may have a greater air permeability and/or mean flow pore size than that of another surface modified layer. For example, an upstream surface modified layer may have a greater air permeability and/or mean flow pore size than that of a downstream surface modified layer. Such a configuration of layers may result in the media having enhanced fluid separation properties (e.g., enhanced fluid coalescence and/or shedding) compared to filter media that do not include such modified layers or configuration of layers, all other factors being equal. The filter media, described herein, may be particularly well-suited for applications that involve filtering fuel, air (e.g., air filters, air-oil coalescing filters), and lube oil though the media may also be used in other applications (e.g., hydraulic applications).

As described herein, the surface modified layers may be used in a filter media to provide high fluid separation efficiency. The increased fluid separation may be achieved, in some instances, by having a surface modification that allows the layer to coalesce and/or repel the fluid to be separated (e.g., water, hydraulic fluid, oil) from the filtration fluid (e.g., hydraulic fluid, fuel, water, air). In other embodiments, the surface modification allows the layer to simply pass a fluid to be separated, such that the fluid can be separated in a downstream layer. In some instances, modifying the surface of a layer with a material may impart wetting characteristics that are difficult to achieve, or cannot be achieved, using fibers alone. For instance, in some embodiments, processing conditions may limit the ability of a material having a relatively high hydrophobicity to be formed into fibers, thus preventing the formation of a relatively high hydrophobic surface using the fibers alone. However, by modifying the surface of an existing fiber web, a variety of hydrophobic materials may be used to provide a hydrophobic surface that is tailored to the degree of hydrophobicity. Similarly, certain processing and/or application constraints may limit the use of certain hydrophilic materials in fiber form; however, modifying the surface of an existing fiber web can allow certain hydrophilic materials to be used to impart a desired hydrophilicity to the surface.

In some embodiments, a filter media comprising two or more layers designed to enhance fluid separation efficiency (e.g., fuel-water separation efficiency) may include at least two surface modified layers. In certain embodiments, a filter media comprising two or more surface modified layers may have enhanced fluid separation efficiency compared to filter media having one or no surface modified layer. In some embodiments, a filter media comprising two or more layers designed to enhance fluid separation efficiency (e.g., fuel-water separation efficiency) may include at least one surface modified layers (e.g., two or more surface modified layers) and at least one layer that is intrinsically hydrophilic or hydrophobic. In certain embodiments, a filter media comprising at least one surface modified layer at least one layer that is intrinsically hydrophilic or hydrophobic may have enhanced fluid separation efficiency compared to filter media having one or no surface modified layer.

In some embodiments, the use of surface modified layers in combination with a trend (e.g., increase, decrease, alternating) in air permeability, fiber diameter distribution, degree of hydrophobicity/hydrophilicity, and/or mean flow pore size from upstream to downstream sides of the filter media may further enhance the fluid separation efficiency. In other embodiments, no such trends present or necessary, and the fluid separation efficiency is enhanced primarily as a result of the surface modified layers in combination with one another.

As used herein, the terms "wet" and "wetting" may refer to the ability of a fluid to interact with a surface such that the contact angle of the fluid with respect to the surface is less than 90 degrees. Accordingly the terms "repel" and "repelling" may refer to the ability of a fluid to interact with a surface such that the contact angle of the fluid with respect to the surface is greater than or equal to 90 degrees.

Figure 1B:
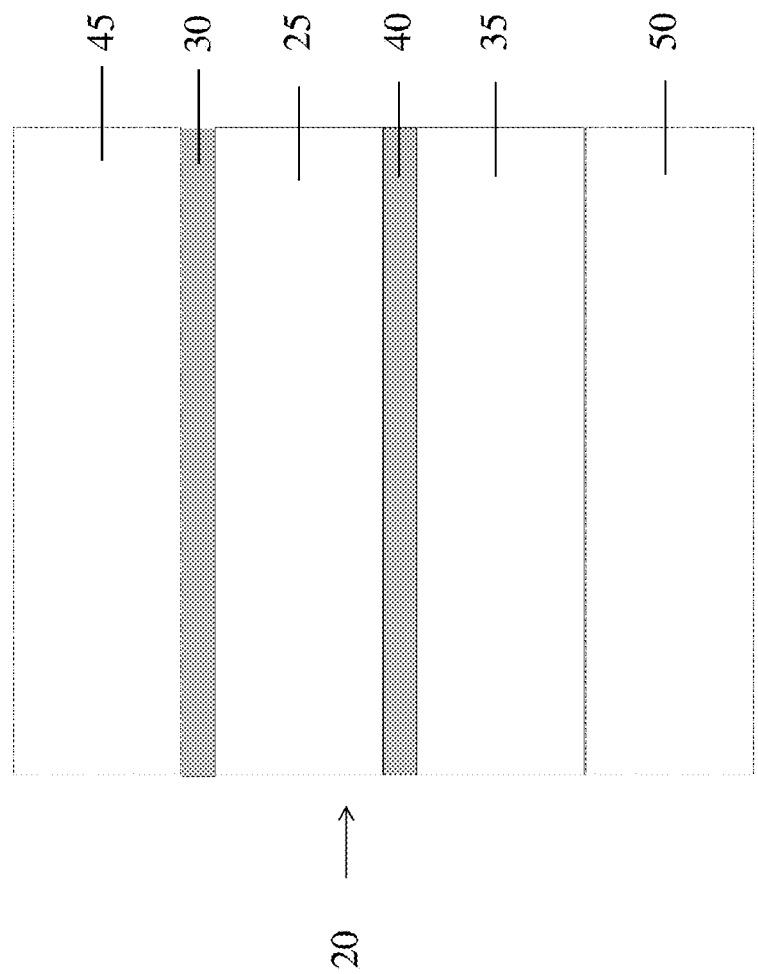

An example of a surface modified layer and a filter media comprising surface modified layers can be seen in FIGS. 1A-B. As shown illustratively in FIG. 1A, a layer 10 may have a surface 12 that is modified with a material 15. In some embodiments, the layer (e.g., a surface of a layer) may be modified to alter and/or enhance the wettability of at least one surface of the layer with respect to a particular fluid (e.g., to make a layer more hydrophilic, or more hydrophobic). In one example, a hydrophilic surface having a water contact angle of 60° may be modified to have a water contact angle of 15°. In another example, a hydrophobic surface having a water contact angle of 100° may be modified to have a water contact angle of 150° or greater. In some embodiments, a surface with a contact angle greater than or equal to 150° C. may be referred to as a "superhydrophobic surface." A superhydrophobic surface may have also have a low hysteresis of the contact angle. In some embodiments, the surface modification may alter the hydrophilicity or hydrophobicity of at least one surface of the layer, such that the layer has the opposite hydrophilicity or hydrophobicity, respectively. For example, a surface of a relatively hydrophobic layer may be modified with a hydrophilic material (e.g., charged material, organic hydrophilic material, inorganic materials such as alumina, silica, metals), such that the modified surface is hydrophilic. Alternatively, in certain embodiments, a surface of a relatively hydrophilic layer may be modified with a hydrophobic material, such that the modified surface is hydrophobic. In some embodiments, the layer may have one modified surface (e.g., upstream surface) and one unmodified surface (e.g., downstream surface). In other embodiment the layer may have two or more modified surfaces (e.g., the upstream and downstream surfaces). In some embodiments, the entire layer may be modified. For example, the interior and the surfaces of the layer may be modified.

In some embodiments, as shown illustratively in FIG. 1B, a filter media 20, shown in cross section, may include a first surface modified layer 25 having a material 30 on its surface, a second surface modified layer 35 having a material 40 on its surface, and one or more optional layers (e.g., 45, 50). In some embodiments, the surface of one or more layer may be modified to be wetting toward the fluid to be separated. In some such embodiments, the wetting surface may be used to cause at least a portion of droplets of the fluid to be separated to coalesce, such that the droplets have the requisite size for removal at a subsequent layer and/or such that the coalesced droplets are able to be separated (e.g., via gravity) at the wetting surface. In some embodiments, the surface of one or more layers may be modified to repel the fluid to be separated. For instance, the repelling surface may substantially block the transport of droplets of the fluid to be separated, such that droplets of a certain size may be inhibited from flowing across the layer having the repelling surface and are separated (e.g., shed) from the filtration fluid.

In some embodiments, the filter media may comprise at least one surface modified layer having a wetting surface or repelling surface as described above. In certain embodiments, the filter media may comprise a surface modified layer having both a wetting surface and a surface modified layer having a repelling surface.

In some embodiments, the one or more optional layers may be upstream and/or downstream of one or more surface modified layer as illustrated in FIG. 1B. The one or more optional layers may optionally be a surface modified layer that has a wetting or repelling surface; however, non-surface modified optional layers are also possible. For instance, in some embodiments, one or more optional layer may be a spacer layer, drainage layer, a scrim, an efficiency layer, a capacity layer, and/or a layer that has a wetting or repelling surface. In certain embodiments, the spacer layer may function as a drainage channel for the fluid to be separated.

In some embodiments, regardless of how the surface of the layers are modified to be hydrophilic or hydrophobic, the filter media may comprise two or more layers (e.g., surface modified layers) having different air permeabilities, fiber size distributions, basis weights, thicknesses, and/or mean flow pore sizes. In certain embodiments, an upstream layer may have a greater air permeability, average fiber diameter, and/or mean flow pore size than a downstream layer. In some such embodiments, the downstream layer may serve to coalesce and/or remove fluid droplets that are not coalesced and/or removed by the upstream layer. For example, the upstream layer may be designed to coalesce and/or remove relatively large droplets and the downstream layer may be designed to coalesce and/or remove smaller droplets that bypass the upstream layer. This may be achieved, for example, by designing the media to include a downstream surface modified layer having an air permeability, average fiber diameter, and/or mean flow pore size that is less than the air permeability, average fiber diameter, and/or mean flow pore size of one or more upstream surface modified layers. For example, in one set of embodiments, each downstream surface modified layer may have a lower air permeability, average fiber diameter, and/or smaller mean flow pore size than the surface modified layer(s) upstream. In another example, the filter media may be arranged such that the air permeability, average fiber diameter, and/or mean flow pore size of the surface modified layers decreases from upstream to downstream. In other embodiments, an upstream layer may have a lower air permeability, average fiber diameter, and/or mean flow pore size than a downstream layer.

Exemplary filter media constructions (Constructs 1-9) having enhanced fluid separation efficiency are described in Table 1 below and illustrated in FIGS. 2-10. Although the table includes particular configurations of hydrophobic and hydrophilic layers, as well as particular ranges of air permeability, basis weight, and thickness ranges, it should be appreciated that other configurations and ranges are possible.

TABLE 1

Various filter media constructs

| Construct | Function | Modification | Air Permeability (CFM) | Basis Wt. ($g/m^2$) | Thickness (mm) |
|---|---|---|---|---|---|
| Construct 1 | Shed | | | | |
| Layer 1 | | Hydrophobic | 200-300 | 5-40 | 0.05-1.0 |
| Layer 2 | | Hydrophobic | 100-200 | 5-40 | 0.05-1.0 |
| Layer 3 | | Hydrophobic | 0.5-100 | 0.1-0.3 | 0.05-1.0 |
| Construct 2 | Coalesce | | | | |
| Layer 1 | | Hydrophilic | 200-300 | 5-40 | 0.05-1.0 |
| Layer 2 | | Hydrophilic | 100-200 | 5-40 | 0.05-1.0 |
| Layer 3 | | Hydrophilic | 0.5-100 | 5-40 | 0.05-1.0 |
| Construct 3 | Shed/Coalesce | | | | |
| Layer 1 | | Hydrophobic | 200-300 | 5-40 | 0.05-1.0 |
| Layer 2 | | Hydrophobic | 100-200 | 5-40 | 0.05-1.0 |
| Layer 3 | | Hydrophobic | 2-100 | 5-40 | 0.05-1.0 |
| Layer 4 | | Hydrophilic | 200-300 | 5-40 | 0.05-1.0 |
| Layer 5 | | Hydrophilic | 100-200 | 5-40 | 0.05-1.0 |
| Layer 6 | | Hydrophilic | 0.5-100 | 5-40 | 0.05-1.0 |
| Construct 4 | Coalesce/Shed | | | | |
| Layer 1 | | Hydrophilic | 200-300 | 5-40 | 0.05-1.0 |

TABLE 1-continued

Various filter media constructs

| Construct | Function | Modification | Air Permeability (CFM) | Basis Wt. (g/m²) | Thickness (mm) |
|---|---|---|---|---|---|
| Layer 2 | | Hydrophilic | 100-200 | 5-40 | 0.05-1.0 |
| Layer 3 | | Hydrophilic | 0.5-100 | 5-40 | 0.05-1.0 |
| Layer 4 | | Hydrophobic | 200-300 | 5-40 | 0.05-1.0 |
| Layer 5 | | Hydrophobic | 100-200 | 5-40 | 0.05-1.0 |
| Layer 6 | | Hydrophobic | 0.5-100 | 5-40 | 0.05-1.0 |
| Construct 5 | Shed/Coalesce/Shed | | | | |
| Layer 1 | | Hydrophobic | 100-200 | 5-40 | 0.05-1.0 |
| Layer 2 | | Hydrophilic | 0.5-100 | 5-40 | 0.05-1.0 |
| Layer 3 | | Hydrophobic | 0.5-100 | 5-40 | 0.05-1.0 |
| Construct 6 | Shed/Coalesce/Shed | | | | |
| Layer 1 | | Hydrophobic | 10-200 | 10-50 | 0.05-1.0 |
| Layer 2 | | Hydrophilic | 0.5-100 | 10-30 | 0.05-1.0 |
| Layer 3 | | Hydrophobic | 0.5-100 | 10-30 | 0.05-1.0 |
| Construct 7 | Coalesce/Shed | | | | |
| Layer 1 | | Hydrophilic | 0.5-200 | 10-100 | 0.05-1.0 |
| Layer 2 | | Hydrophobic | 0.5-200 | 10-100 | 0.05-1.0 |
| Construct 8 | Coalesce/Coalesce/Shed | | | | |
| Layer 1 | | Hydrophilic | 0.5-200 | 10-100 | 0.05-1.0 |
| Layer 2 | | Hydrophilic | 0.5-200 | 10-100 | 0.05-1.0 |
| Layer 3 | | Hydrophobic | 0.5-200 | 10-100 | 0.05-1.0 |
| Construct 9 | Coalesce/Coalesce | | | | |
| Layer 1 | | Hydrophilic/Hydrophilic | 0.5-200 | 10-150 | 0.2-2 |
| Construct 10 | Shed/Coalesce | | | | |
| Layer 1 | | Hydrophobic/Hydrophilic | 0.5-200 | 10-150 | 0.2-2 |

Figure 2:
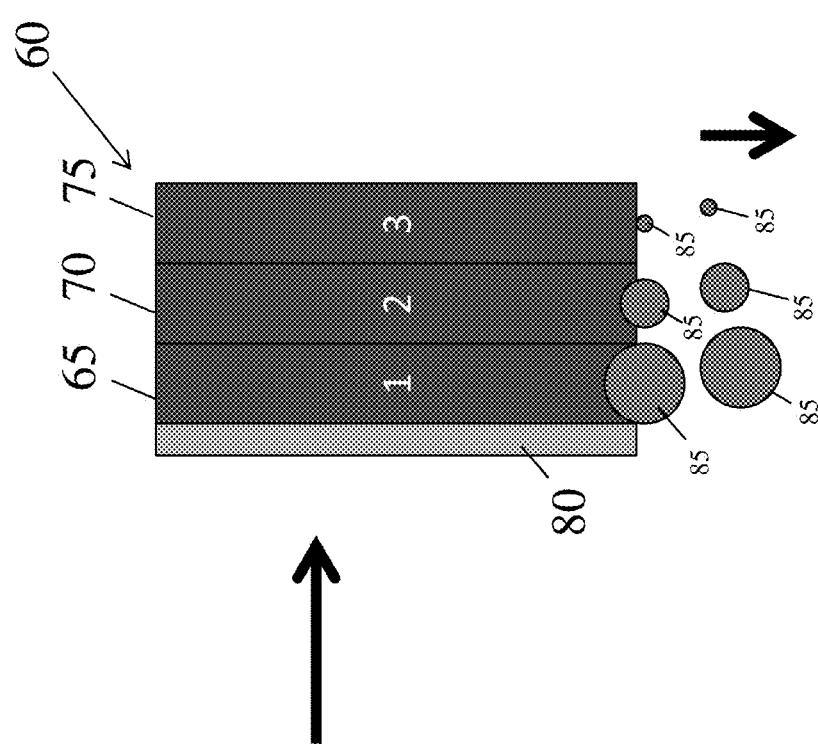
FIG. 2 is a schematic diagram showing a cross-section of a filter media including multiple layers and a modified surface of one of the layers according to one set of embodiments.

In some embodiments, as illustrated in FIG. 2, a filter media 60 designed to remove droplets of a relatively hydrophilic fluid (e.g., water, polar liquids) 85 may comprise a plurality of hydrophobic surface modified layers that vary in air permeability and/or mean flow pore size. In certain embodiments, filter media 60 may comprise an optional layer 80 (e.g., a scrim layer, mesh (e.g., wire, plastic, epoxy), drainage layer) upstream of the surface modified layers 65, 70, and 75, as illustrated in FIG. 2. In some embodiments, the air permeability and/or mean flow pore size of the surface modified layers may decrease from upstream to downstream. In some such embodiments, a downstream layer may shed smaller droplets than one or more upstream layers as depicted in the figure. In general, fluid removed from the filtration fluid may be collected onto a collection vessel fitted to a filter element or drained automatically. In some embodiments, filter media 60 may have the characteristics shown in Table 1 for Construct 1.

Figure 3:
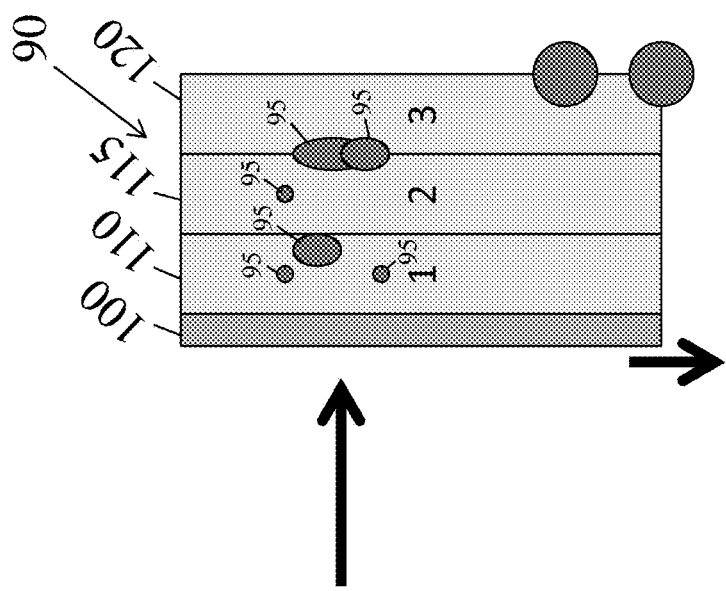
FIG. 3 is a schematic diagram showing a cross-section of a filter media including multiple layers and a modified surface of one of the layers according to one set of embodiments.

Alternatively, as illustrated in FIG. 3, a filter media 90 designed to coalesce hydrophilic fluid droplets 95 may comprise a plurality of surface modified hydrophilic layers that vary in air permeability and/or mean flow pore size. The filter media may comprise an optional layer 100 (e.g., a scrim layer) upstream of the surface modified layers 110, 115, and 120, as illustrated in FIG. 3. In some embodiments, the air permeability and/or mean flow pore size of the surface modified layers may decrease from upstream to downstream. In some such embodiments, a downstream layer may coalesce smaller droplets than one or more upstream layers. In some embodiments, filter media 90 may have the characteristics shown in Table 1 for Construct 2.

Figure 4:
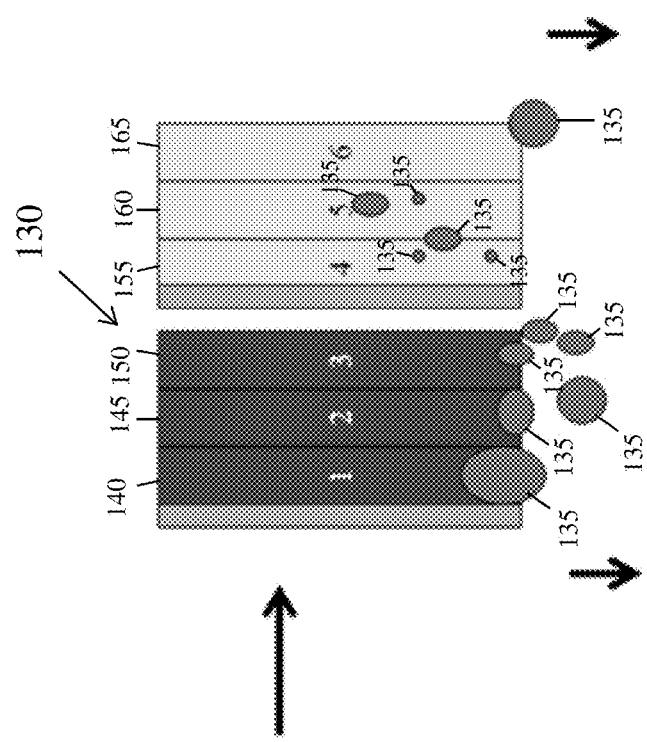
FIG. 4 is a schematic diagram showing a cross-section of a filter media including both hydrophilic and hydrophobic layers according to one set of embodiments.

In some embodiments, a filter media may be designed to both coalesce and shed fluid droplets. For example, as illustrated in FIGS. 4-8, the filter media may comprise one or more layers having a surface modified to wet the fluid to be separated and one or more layers having a surface modified to repel the fluid to be separated. In certain embodiments, a filter media 130 designed to separate hydrophilic fluid 135 from a filtration fluid may comprise a plurality of hydrophobic surface modified layers (e.g., 140, 145, 150) upstream of a plurality of hydrophilic surface modified layers (e.g., 155, 160, 165), as illustrated in FIG. 4. The upstream hydrophobic surface modified layers may serve to remove hydrophilic droplets (e.g., via shedding) and the downstream hydrophilic surface modified layers may serve to coalesce and remove (e.g., via gravity) at least a portion of remaining hydrophilic fluid in the filtration fluid. For example, the larger hydrophilic fluid droplets may be shed upstream via the hydrophobic surface modified layers and the remaining hydrophilic fluid droplets may coalesce at the hydrophilic surface modified layers to form larger droplets that are removed via gravity. In some embodiments, filter media 130 may have the characteristics shown in Table 1 for Construct 3.

Figure 5:
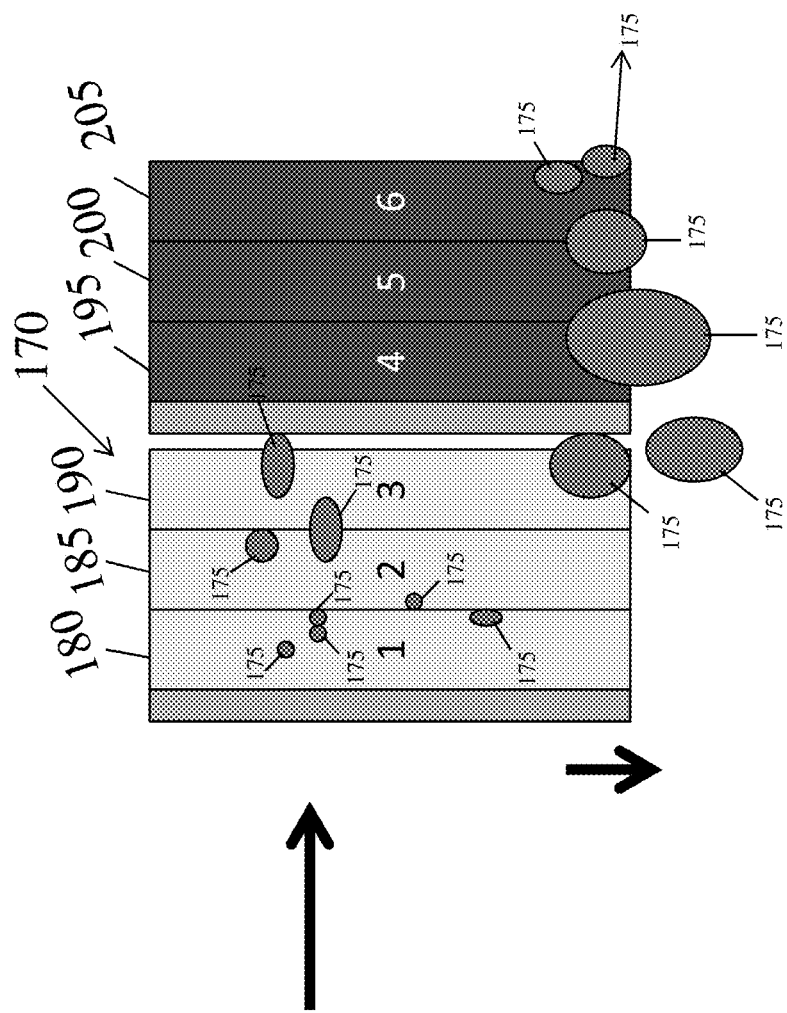
FIG. 5 is a schematic diagram showing a cross-section of a filter media according to one set of embodiments.

Alternatively, as illustrated in FIG. 5, a filter media 170 designed to separate hydrophilic fluid 175 from a filtration fluid may comprise a plurality of hydrophilic surface modified layers (e.g., 180, 185, 190) upstream of a plurality of hydrophobic surface modified layers (e.g., 195, 200, 205). The upstream hydrophilic surface modified layers may serve to coalesce and remove (e.g., via gravity) hydrophilic droplets and the downstream hydrophobic surface modified layers may serve to remove at least a portion of remaining hydrophilic fluid in the filtration fluid. For example, hydrophilic fluid droplets may coalesce at the hydrophilic surface modified layers to form larger droplets that are removed via gravity or downstream via the hydrophobic surface modified layers. In some embodiments, the air permeability, average fiber diameter, and/or mean flow pore size of the plurality of hydrophobic modified layers and/or the air permeability, average fiber diameter, and/or mean flow pore size of the plurality of hydrophilic modified layers may decrease from upstream to downstream. In some embodiments, filter media 170 may have the characteristics shown in Table 1 for Construct 4.

Figure 6:
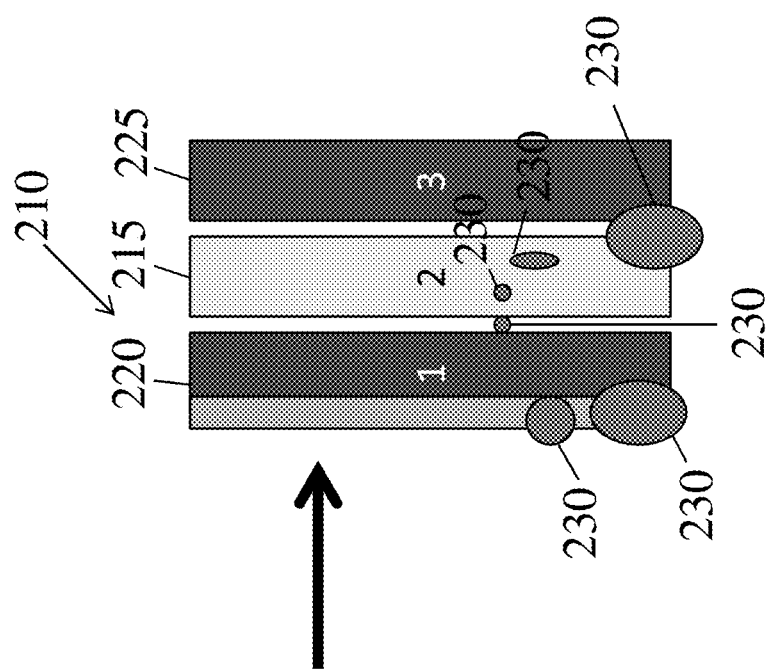
FIG. 6 is a schematic diagram showing a cross-section of a filter media according to one set of embodiments.
Figure 7:
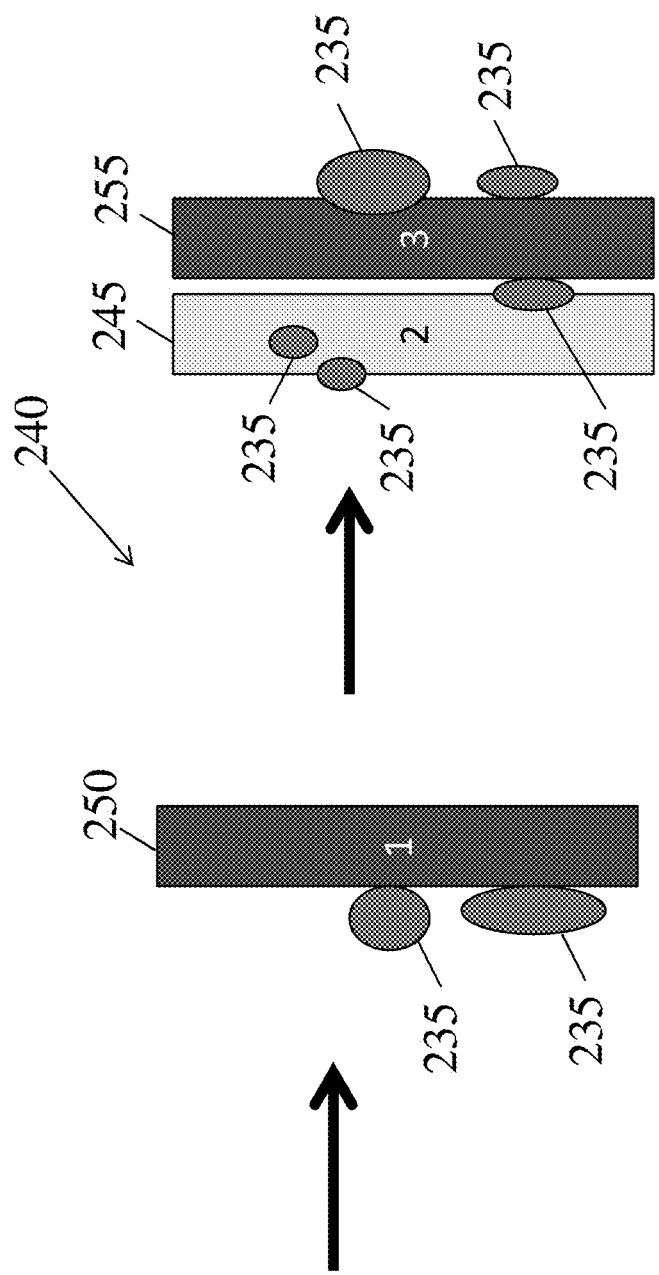
FIG. 7 is a schematic diagram showing a cross-section of a filter media according to one set of embodiments.
Figure 8:
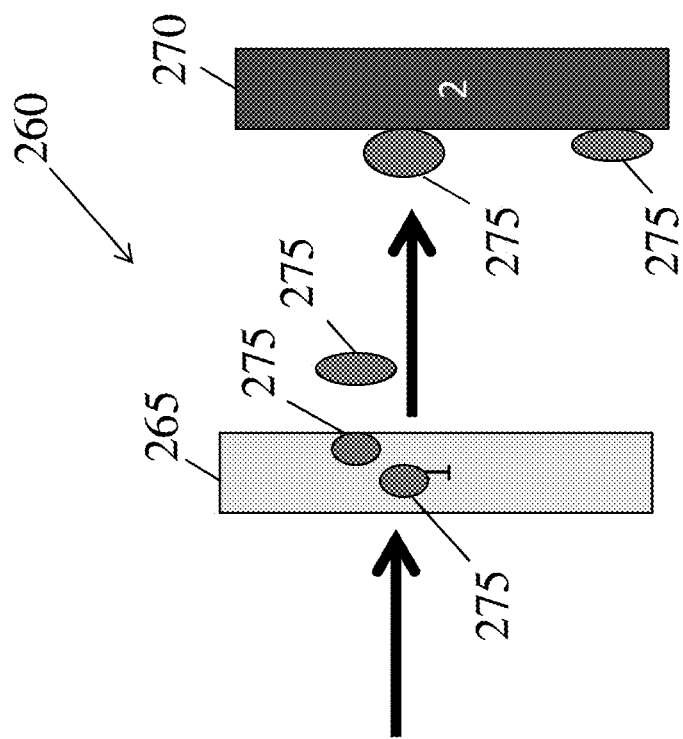
FIG. 8 is a schematic diagram showing a cross-section of a filter media according to one set of embodiments.

In some embodiments, a filter media or filter arrangement including one or more layers having a surface modified to wet the fluid to be separated and one or more layer having a surface modified to repel the fluid/fluid droplets to be separated may be arranged as shown in FIGS. 6-8. In some embodiments, the surface modified layers may be arranged to alternate in wettability. For instance, as illustrated in FIGS. 6 and 7, a filter media (e.g., filter media 210 of FIG. 6) or filter arrangement (e.g., filter arrangement 240 of FIG. 7) may comprise a hydrophilic surface modified layer (e.g., 215, 245) positioned between two hydrophobic surface modified layers (e.g., 220 and 225, 250 and 255). In some such embodiments, the upstream hydrophobic surface modified layer may repel and remove hydrophilic droplets having a relatively large diameter, such that at least a portion of the relatively large droplets do not interfere with coalescence of droplets having a relatively small diameter at an intermediate hydrophilic surface modified layer. A downstream hydrophilic layer may serve to repel and remove at least a portion of the coalesced droplets. In some embodiments, filter media 210 may have the characteristics shown in Table 1 for Construct 5.

In another example, a filter media or filter arrangement may comprise a hydrophobic surface modified layer positioned between two hydrophilic surface modified layers. In some such embodiments, the upstream hydrophilic surface modified layer may pre-coalesce at least a portion of droplets having a relatively small diameter to form larger droplets that may be shed at the intermediate hydrophobic surface modified layer. At least a portion of the remaining droplets may be coalesced and removed (e.g., via gravity) at the downstream hydrophilic surface modified layer.

In certain embodiments, as illustrated in FIGS. 7 and 8, a filter arrangement may have at least one upstream surface modified layer (e.g., 250, 265) in an upstream stage that is separated from another surface modified layer, (e.g., 245, 255, 270) in a downstream stage by, e.g., intervening layers. In some such embodiments, the upstream layer may serve to coalesce or repel at least a portion of the fluid to be separated (e.g., droplets having a relatively large diameter) in the filtration fluid prior to the filtration fluid reaching a downstream filter media or stage (e.g., high particulate efficiency media, high particulate efficiency stage). In some embodiments, filter arrangement 240 may have the characteristics shown in Table 1 for Construct 6. In certain embodiments, filter arrangement 260 may have the characteristics shown in Table 1 for Construct 7.

Figure 9:
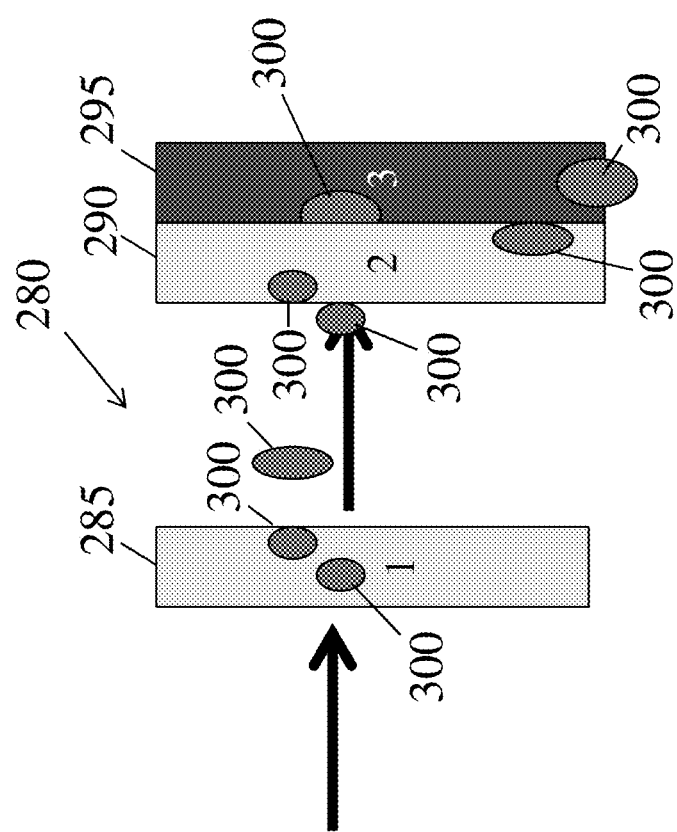
FIG. 9 is a schematic diagram showing a cross-section of a filter media according to one set of embodiments.

In certain embodiments, as illustrated in FIGS. 7 and 9, a dual stage filter arrangement (e.g., 240, 280) may comprise at least one surface modified layer (e.g., 250, 285) that is separated from two or more surface modified layers (e.g., 245 and 255, 290 and 295) by one or more intervening layers or by a spacing. In some such embodiments, the separated surface modified layer (e.g., 250, 285) may be upstream of the stage comprising the two or more surface modified layers (e.g., 245 and 255, 290 and 295). In some applications the upstream stage may comprise a hydrophobic surface modified layer and in other applications the layer may be a hydrophilic surface modified layer. In some embodiments, filter arrangement 280 may have the characteristics shown in Table 1 for Construct 8.

Figure 10:
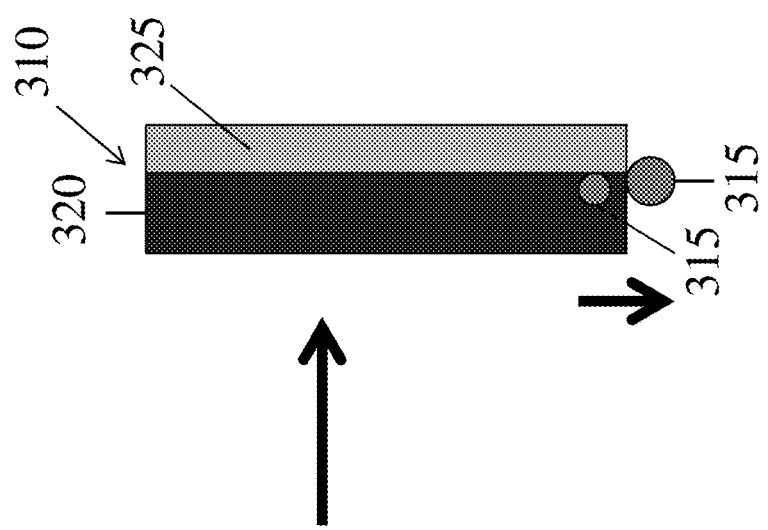
FIG. 10 is a schematic diagram showing a cross-section of a filter media according to one set of embodiments.
Figure 11:
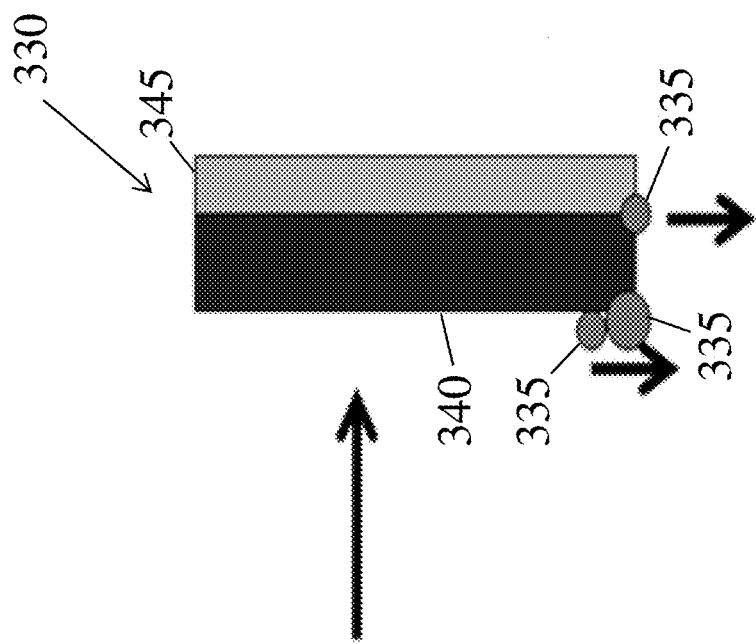
FIG. 11 is a schematic diagram showing a cross-section of a filter media according to one set of embodiments.

In some embodiments, a filter media designed to enhance fluid separation efficiency may be a dual phase filter media (e.g., a media including intermingling of fibers between layers and/or a media in which a clear demarcation of layers is not apparent) as shown illustratively in FIGS. 10 and 11. In certain embodiments, the upstream phase of the media may be surface modified to be hydrophilic or hydrophobic. In some such embodiments, the downstream phase may be selected such that the interface between the phases is naturally hydrophilic or hydrophobic. As illustrated in FIG. 10, a dual phase media 310 may comprise an upstream phase 320 having a hydrophilic surface modification and a downstream phase 325 that is naturally hydrophilic. In such embodiments, both the surface of the dual phase filter media and the interface between the phases may serve to coalesce droplets 315 of the fluid to be separated. In another example, as illustrated in FIG. 11, a dual phase media 330 may comprise an upstream phase 340 having a hydrophobic surface modification and a downstream phase 345 that is naturally hydrophilic. In such embodiments, the surface of the dual phase filter media may shed droplets 335 of the fluid to be separated and the hydrophilic interface between the phases may serve to coalesce and remove via gravity at least a portion of the remaining droplets of the fluid to be separated. In some embodiments, filter media 310 may have the characteristics shown in Table 1 for Construct 9. In certain embodiments, filter media 330 may have the characteristics shown in Table 1 for Construct 10.

It should be understood that the configurations of the layers shown in the figures are by way of example only, and that in other embodiments, filter media including other configurations of layers may be possible. For example, while the first and second (and optional third, fourth, etc.) layers are shown in a specific order in FIGS. 1-9, in other embodiments, the optional third layer may be positioned between the first and second layers. In other embodiments, the first layer may be positioned between the second and optional third layers. In yet other embodiments, one or more intervening layers, such as non-surface modified layer(s) may be present between two layers. Other configurations are also possible. Additionally, it should be appreciated that the terms "first", "second", "third" and "fourth" layers, as used herein, refer to different layers within the media, and are not meant to be limiting with respect to the particular function of that layer. For example, while a "first" layer may be described as being a layer for enhancing coalescence in some embodiments, in other embodiments, a "first" layer may be used to describe a layer used for enhancing fluid removal (e.g., shedding). Likewise, each of a "second", "third" and "fourth" layers may independently be used to describe a layer for enhancing fluid droplet coalescence or removal. Furthermore, in some embodiments, additional layers (e.g., "fifth", "sixth", or "seventh" layers) may be present in addition to the ones shown in the figures. For instance, in some embodiments, a filter media or filter arrangement may comprise up to about twenty layers. It should also be appreciated that not all components shown in the figures need be present in some embodiments. For instance, in some embodiments, at least some level of coalescence can take place after the last downstream layer.

It should also be understood that for the embodiments described above, a surface modified layer may be replaced with a layer that intrinsically has the desired wetting characteristics with respect to a particular fluid and lacks a surface modification. However, in some embodiments, surface modifications (e.g., roughness, material) is needed to achieve the desired wetting characteristics.

As noted above, a filter media described herein may include at least two surface modified layers. In general, any suitable method for modifying the surface of a layer may be used. In some embodiments, the surface of a layer may be modified by coating at least a portion of the surface, using melt-additives, and/or altering the roughness of the surface.

In some embodiments, the surface modification may be a coating. In certain embodiments, a coating process involves introducing resin or a material (e.g., hydrophobic material, hydrophilic material) dispersed in a solvent or solvent mixture into a pre-formed fiber layer (e.g., a pre-formed fiber web formed by a meltblown process). Non-limiting examples of coating methods include the use of vapor deposition (e.g., chemical vapor, physical vapor deposition), layer-by-layer deposition, wax-solidification, self-assembly, sol-gel processing, a slot die coater, gravure coating, screen coating, size press coating (e.g., a two roll-type or a metering blade type size press coater), film press coating, blade coating, roll-blade coating, air knife coating, roll coating, foam application, reverse roll coating, bar coating, curtain coating, champlex coating, brush coating, Bill-blade coating, short dwell-blade coating, lip coating, gate roll coating, gate roll size press coating, laboratory size press coating, melt coating, dip coating, knife roll coating, spin coating, spray coating (e.g., electrospraying), gapped roll coating, roll transfer coating, padding saturant coating, and saturation impregnation. Other coating methods are also possible. In some embodiments, the hydrophilic or hydrophobic material may be applied to the fiber web using a non-compressive coating technique. The non-compressive coating technique may coat the fiber web, while not substantially decreasing the thickness of the web. In other embodiments, the resin may be applied to the fiber web using a compressive coating technique.

In one set of embodiments, a surface described herein is modified using chemical vapor deposition, e.g., a surface or a layer may comprise a chemical vapor deposition coating. In chemical vapor deposition, the fiber web is exposed to gaseous reactants from gas or liquid vapor that are deposited onto the fiber web under high energy level excitation such as thermal, microwave, UV, electron beam or plasma. Optionally, a carrier gas such as oxygen, helium, argon and/or nitrogen may be used.

Other vapor deposition methods include atmospheric pressure chemical vapor deposition (APCVD), low pressure chemical vapor deposition (LPCVD), metal-organic chemical vapor deposition (MOCVD), plasma assisted chemical vapor deposition (PACVD) or plasma enhanced chemical vapor deposition (PECVD), laser chemical vapor deposition (LCVD), photochemical vapor deposition (PCVD), chemical vapor infiltration (CVI) and chemical beam epitaxy (CBE).

In physical vapor deposition (PVD) thin films are deposited by the condensation of a vaporized form of the desired film material onto substrate. This method involves physical processes such as high-temperature vacuum evaporation with subsequent condensation, or plasma sputter bombardment rather than a chemical reaction.

After applying the coating to the fiber web, the coating may be dried by any suitable method. Non-limiting examples of drying methods include the use of a photo dryer, infrared dryer, hot air oven steam-heated cylinder, or any suitable type of dryer familiar to those of ordinary skill in the art.

In some embodiments, at least a portion of the fibers of a layer (e.g., surface modified) may be coated without substantially blocking the pores of the fiber web. In some instances, substantially all of the fibers may be coated without substantially blocking the pores. In some embodiments, the fiber web may be coated with a relatively high weight percentage of resin or material without blocking the pores of a layer (e.g., surface modified) using the methods described herein (e.g., by dissolving and/or suspending one or more material in a solvent to form the resin).

In some embodiments, the surface may be modified using melt additives. Melt-additives are functional chemicals that are added to thermoplastics fibers during an extrusion process that may render different physical and chemical properties at the surface from those of the thermoplastic itself after formation.

In some embodiments, the material may undergo a chemical reaction (e.g., polymerization) after being applied to a layer. For example, a surface of a layer may be coated with one or more monomers that is polymerized after coating. In another example, a surface of a layer may include monomers, as a result of a melt additive, that are polymerized after formation of the fiber web. In some such embodiments, an in-line polymerization may be used. In-line polymerization (e.g., in-line ultraviolet polymerization) is a process to cure a monomer or liquid polymer solution onto a substrate under conditions sufficient to induce polymerization (e.g., under UV irradiation).

In layer-by-layer (LBL) deposition, molecules with alternating electrostatic charge are used to form a material having layers with alternating electrostatic charge. Briefly, LBL materials are formed by depositing molecules (e.g., polycation) having a first charge on a surface to from a first charged molecular layer and depositing oppositely charged molecules (e.g., polyanion) on the first charged molecular layer to form a second charged molecular layer. The process may be repeated to form a material having the desired number of layer. In general, LBL material may be particularly well-suited for modifying a surface to be hydrophilic. In certain embodiments, the LBL material may be further modified to render the LBL surface hydrophobic. In some embodiments, particles (e.g., nanoparticle) may be incorporated into the LBL material in order to enhance the roughness effects.

The term "self-assembled monolayers" (SAMs) refers to molecular assemblies that may be formed spontaneously by the immersion of an appropriate substrate into a solution of an active surfactant in an organic solvent to create a hydrophobicity or hydrophilicity surface.

In wax solidification, the layer is dipped into melted alkylketene dimer (AKD) heated at 90° C., and then cooled at room temperature in an atmosphere of dry $N_2$ gas. AKD undergoes fractal growth when it solidifies and improves the hydrophobicity of the substrate.

In some embodiments, a surface may be modified by roughening the surface or material on the surface of a layer. In some such cases, the surface modification may be a roughened surface or material. The surface roughness of the surface of a layer or material on the surface of a layer may be roughened microscopically and/or macroscopically. Non-limiting examples of methods for enhancing roughness include modifying a surface with certain fibers, mixing fibers having different diameters, and lithography. In certain embodiments, fibers with different diameters (e.g., staple fibers, continuous fibers) may be mixed or used to enhance or decrease surface roughness. In some embodiments, electrospinning may be used to create applied surface roughness alone or in combination with other methods, such as chemical vapor deposition. In some embodiments, lithography may be used to roughen a surface. Lithography encompasses many different types of surface preparation in which a design is transferred from a master onto a surface. In general, the contact angle of roughness surface may be given by Wenzel's equation for homogenous surfaces or the Cassie Baxter equation for heterogeneous surfaces (e.g., composite surface of flat solid tops and flat air gaps). The roughness ratio can be found by using the Wenzel equation. The roughness ratio is defined as the ratio of true area of the solid surface to the apparent area and is a measure of how the surface roughness affects a homogeneous surface. For different surface roughness within the same media, different fractions of wetted solid surface areas are calculated.

In general, any suitable material may be used to alter the surface chemistry, and accordingly the wettability, of a layer (e.g., surface modified). In some embodiments, the material may be charged. In some such embodiments, as described in more detail herein, the surface charge of a layer (e.g., surface modified) may further facilitate coalescence and/or increase the water separation efficiency. For instance, in certain embodiments, a second layer having a charged, hydrophilic modified surface may have a greater fuel-water separation efficiency and/or produce larger coalesced droplets than a second layer having an uncharged hydrophilic modified surface or a non-modified surface. In other embodiments, the surface charge of a layer (e.g., surface modified) renders the surface hydrophilic, but may not otherwise facilitate coalescence and/or increase the water separation efficiency.

In general, the net charge of the modified surface may be negative, positive, or neutral. In some instances, the modified surface may comprise a negatively charged material and/or a positively charged material. In some embodiments, the surface may be modified with an electrostatically neutral material. Non-limiting examples of materials that may be used to modify the surface include polyelectrolytes (e.g., anionic, cationic), oligomers, polymers (e.g., perfluoroalkyl ethyl methacrylate, polycaprolactone, poly[bis(trifluoroethoxy)phosphazene], polymers having carboxylic acid moieties, polymers having amine moieties, polyol), small molecules (e.g., carboxylate containing monomers, polymers having amine containing monomers, polyol), ionic liquids, monomer precursors, metals (e.g., gold, copper, tin, zinc, silicon, indium, tungsten), and gases, and combinations thereof.

In some embodiments, anionic polyelectrolytes may be used to modify the surface of a layer (e.g., surface modified). For example, one or more anionic polyelectrolytes may be spray or dip coated onto at least one surface of a layer (e.g., surface modified). Non-limiting examples of anionic polyelectrolytes that may be used to modify a surface include poly(2-acrylamido-2-methyl-1-propanesulfonic acid), poly(2-acrylamido-2-methyl-1-propanesulfonic acid-co-acrylonitrile), poly(acrylic acid), polyanetholesulfonic, poly(sodium 4-styrenesulfonate), poly(4-styrenesulfonic acid), poly(4-styrenesulfonic acid), poly(4-styrenesulfonic acid-co-maleic acid), poly(vinyl sulfate), and poly(vinylsulfonic acid, sodium), and combinations thereof.

In some embodiments, cationic polyelectrolytes may be used to modify the surface of a layer (e.g., surface modified). Non-limiting examples of cationic polyelectrolytes that may be used to modify a surface include polydiallyldimethylammonium chloride (PDDA), polyallyamine hydrochloride, poly(acrylamide-co-dimethylaminoethylacrylate-methyl), poly(acrylamide-co-diallyldimethylammonium), poly(4-vinyl pyridine), and amphiphilic polyelectrolytes of ionene type with ionized backbones, and combinations thereof.

In other embodiments, a surface modified layer may include a non-charged material used to modify the surface of the layer.

In some embodiments, small molecules (e.g., monomers, polyol) may be used to modify at least one surface of a layer. For example, polyols (e.g., glycerin, pentaerythritol, ethylene glycol, propylene glycol, sucrose), monobasic carboxylic acids, unsaturated dicarboxylic acids, and/or small molecules containing one or more amine may be used to modify at least one surface of a layer. In certain embodiments, small molecules may be used as melt-additives. In another example, small molecules may be deposited on at least one surface of a layer (e.g., surface modified) via coating (e.g., chemical vapor deposition). Regardless of the modification method, the small molecules on a surface of a layer (e.g., surface modified) may be polymerized after deposition in some embodiments.

In certain embodiments, the small molecules, such as monobasic carboxylic acids and/or unsaturated dicarboxylic (dibasic) acids, may be used to modify at least one surface of a layer. For example, in some instances, monobasic carboxylic acids and/or unsaturated dicarboxylic (dibasic) acids may be polymerized after deposition using in-line ultraviolet polymerization. Non-limiting example of monobasic carboxylic acids that may be used to modify at least one surface of a layer include acrylic acid, methacrylic acid, crotonic acid, angelic acid, cytronellic acid, ricin acid, palmitooleic acid, erucic acid, 4-vinylbenzoic acid, sorbic acid, geranic acid, linolenic acid, and dehydrogeranic acid, and combinations thereof. Non-limiting example of unsaturated dicarboxylic (dibasic) acids that may be used to modify at least one surface of a layer include maleic acid, itaconic acid, acetylendicarboxylic acid, and maleic acid monoamide acid, and combinations thereof.

In certain embodiments, the small molecules may be amine containing small molecules. The amine containing small molecules may be primary, secondary, or tertiary amines. In some such cases, the amine containing small molecule may be a monomer. Non-limiting examples of amine containing small molecules (e.g., amine containing monomers) that may be used to modify at least one surface of a layer (e.g., surface modified) include allylamine, 2-aminophenyl disulfide, 4-aminophenyl propargyl ether, 1,2,4,5-benzenetetracarboxamide, 1,2,4,5-benzenetetramine, 4,4'-(1,1'-biphenyl-4,4'-diyldioxy)dianiline, 2,2-bis(aminoethoxy)propane, 6-chloro-3,5-diamino-2-pyrazinecarboxamide, 4-chloro-o-phenylenediamine, 1,3-cyclohexanebis(methylamine), 1,3-diaminoacetone, 1,4-diaminoanthraquinone, 4,4'-diaminobenzanilide, 3,4-diaminobenzophenone, 4,4'-diaminobenzophenone, 2,6-diamino-4-chloropyrimidine 1-oxide, 1,5-diamino-2-methylpentane, 1,9-diaminononane, 4,4'-diaminooctafluorobiphenyl, 2,6-diaminopurine, 2,4-diaminotoluene, 2,6-diaminotoluene, 2,5-dichloro-p-phenylenediamine, 2,5-dimethyl-1,4-phenylenediamine, 2-dimethyl-1,3-propanediamine, 4,9-dioxa-1,12-dodecanediamine, 1,3-diaminopentane, 2,2'-(ethylenedioxy)bis(ethylamine), 4,4'-(hexafluoroisopropylidene)bis(p-phenyleneoxy)dianiline, 4,4'-(hexafluoroisopropylidene)dianiline, 5,5'-(hexafluoroisopropylidene)di-o-toluidine, 4,4'-(4,4'-isopropylidenediphenyl-1,1'-diyldioxy)dianiline, 4,4'-methylene-bis(2-chloroaniline), 4,4'-methylenebis(cyclohexylamine), 4,4'-methylenebis(2,6-diethylaniline), 4,4'-methylenebis(2,6-dimethylaniline), 3,3'-methylenedianiline, 3,4'-oxydianiline, 4,4'-(1,3-phenylenediisopropylidene)bisaniline, 4,4'-(1,4-phenylenediisopropylidene)bisaniline, 4,4'-(1,3-phenylenedioxy)dianiline, (1,4-butanediol)bis(4-aminobenzoate) oligomer, 2,3,5,6-tetramethyl-p-phenylenediamine, 2,4,6-trimethyl-m-phenylenediamine, 4,7,10-trioxa-1,13-tridecanediamine, tris(2-aminoethyl)amine, p-xylylenediamine, cyclen, N,N'-diethyl-2-butene-1,4-diamine, N,N'-diisopropylethylenediamine, N,N'-diisopropyl-1,3-propanediamine, N,N'-dimethyl-1,3-propanediamine, N,N'-diphenyl-p-phenylenediamine, 2-(penta-4-ynyl)-2-oxazoline, 1,4,8,12-tetraazacyclopentadecane, 1,4,8,11-tetraazacyclotetradecane-5,7-dione, 1-[bis [3-(dimethylamino)propyl]amino]-2-propanol, 1,4-diazabicyclo[2.2.2]octane, 1,6-diaminohexane-N,N,N',N'-tetraacetic acid, 2-[2-(dimethylamino)ethoxy]ethanol, N,N, N',N'',N'''-pentamethyldiethylenetriamine, N,N,N',N'-tetraethyl-1,3-propanediamine, N,N,N',N'-tetramethyl-1,4-butanediamine, N,N,N',N'-tetramethyl-2-butene-1,4-diamine, N,N,N',N'-tetramethyl-1,6-hexanediamine, 1,4,8, 11-Tetramethyl-1,4,8,11-tetraazacyclotetradecane, and 1,3, 5-Trimethylhexahydro-1,3,5-triazine, and combinations thereof. In certain embodiments, an amine containing monomer may be a derivative of one or more of the above-referenced amine containing small molecules (e.g., acrylamide) that has one or more functional groups (e.g., unsaturated carbon-carbon bond) capable of reacting with other molecules to form a polymer.

In some embodiments, the small molecule may be an inorganic or organic hydrophobic molecule. Non-limiting examples include hydrocarbons (e.g., $CH_4$, $C_2H_2$, $C_2H_4$, $C_6H_6$), fluorocarbons (e.g., $CF_4$, $C_2F_4$, $C_3F_6$, $C_3F_8$, $C_4H_8$, $C_5H_{12}$, $C_6F_6$), silanes (e.g., $SiH_4$, $Si_2H_6$, $Si_3H_8$, $Si_4H_{10}$), organosilanes (e.g., methylsilane, dimethylsilane, triethylsilane), siloxanes (e.g., dimethylsiloxane, hexamethyldisiloxane), ZnS, CuSe, InS, CdS, tungsten, silicon carbide, silicon nitride, silicon oxynitride, titanium nitride, carbon, silicon-germanium, and hydrophobic acrylic monomers terminating with alkyl groups and their halogenated derivatives (e.g., ethyl 2-ethylacrylate, methyl methacrylate; acrylonitrile). In certain embodiments, suitable hydrocarbons for modifying a surface of a layer may have the formula $C_xH_y$, where x is an integer from 1 to 10 and y is an integer from 2 to 22. In certain embodiments, suitable silanes for modifying a surface of a layer may have the formula $Si_nH_{2n+2}$ where any hydrogen may be substituted for a halogen (e.g., Cl, F, Br, I), and where n is an integer from 1 to 10.

As used herein, "small molecules" refers to molecules, whether naturally-occurring or artificially created (e.g., via chemical synthesis) that have a relatively low molecular weight. Typically, a small molecule is an organic compound (i.e., it contains carbon). The small organic molecule may contain multiple carbon-carbon bonds, stereocenters, and other functional groups (e.g., amines, hydroxyl, carbonyls, and heterocyclic rings, etc.). In certain embodiments, the molecular weight of a small molecule is at most about 1,000 g/mol, at most about 900 g/mol, at most about 800 g/mol, at most about 700 g/mol, at most about 600 g/mol, at most about 500 g/mol, at most about 400 g/mol, at most about 300 g/mol, at most about 200 g/mol, or at most about 100 g/mol. In certain embodiments, the molecular weight of a small molecule is at least about 100 g/mol, at least about 200 g/mol, at least about 300 g/mol, at least about 400 g/mol, at least about 500 g/mol, at least about 600 g/mol, at least about 700 g/mol, at least about 800 g/mol, or at least about 900 g/mol, or at least about 1,000 g/mol. Combinations of the above ranges (e.g., at least about 200 g/mol and at most about 500 g/mol) are also possible.

In some embodiments, polymers may be used to modify at least one surface of a layer. For example, one or more polymer may be applied to at least a portion of a surface of a layer via a coating technique. In certain embodiments, the polymer may be formed from monobasic carboxylic acids and/or unsaturated dicarboxylic (dibasic) acids. In certain embodiments, the polymer may be a graft copolymer and may be formed by grafting polymers or oligomers to polymers in the fibers and/or fiber web (e.g., resin polymer). The graft polymer or oligomer may comprise carboxyl moieties that can be used to form a chemical bond between the graft and polymers in the fibers and/or fiber web. Non-limiting examples of polymers in the fibers and/or fiber web that can be used to form a graft copolymer include polyethylene, polypropylene, polycarbonate, polyvinyl chloride, polytetrafluoroethylene, polystyrene, cellulose, polyethylene terephthalate, polybutylene terephthalate, and nylon, and combinations thereof. Graft polymerization can be initiated through chemical and/or radiochemical (e.g., electron beam, plasma, corona discharge, UV-irradiation) methods. In some embodiments, the polymer may be a polymer having a repeat unit that comprises an amine (e.g., polyallylamine, polyethyleneimine, polyoxazoline). In certain embodiments, the polymer may be a polyol.

In some embodiments, a gas may be used to modify at least one surface of a layer (e.g., surface modified). In some such cases, the molecules in the gas may react with material (e.g., fibers, resin, additives) on the surface of a layer (e.g., surface modified) to form functional groups, such as charged moieties, and/or to increase the oxygen content on the surface of the layer. Non-limiting examples of functional groups include hydroxyl, carbonyl, ether, ketone, aldehyde, acid, amide, acetate, phosphate, sulfite, sulfate, amine, nitrile, and nitro groups. Non-limiting examples of gases that may be reacted with at least one surface of a layer (e.g., surface modified) includes $CO_2$, $SO_2$, $SO_3$, $NH_3$, $N_2H_4$, $N_2$, $H_2$, He, Ar, and air, and combinations thereof.

In some embodiments, the roughness of a layer may be used to modify the wettability of a layer with respect to a particular fluid. In some instances, the roughness may alter or enhance the wettability of a surface of a layer. For instance, roughness may be used to convert an intrinsically hydrophilic surface to a hydrophobic surface. In some cases, roughness may be used to enhance the hydrophobicity of an intrinsically hydrophobic surface. Those of ordinary skill in the art would be knowledgeable of methods to alter the roughness of the surface of a fiber web.

In some embodiments, the roughness of a surface of a layer may be greater than or equal to about 50 SU, greater than or equal to about 100 SU, greater than or equal to about 150 SU, greater than or equal to about 200 SU, greater than or equal to about 250 SU, greater than or equal to about 300 SU, greater than or equal to about 350 SU, greater than or equal to about 400 SU, or greater than or equal to about 450 SU. In some instances, the roughness of a layer may be less than or equal to about 470 SU, less than or equal to about 450 SU, less than or equal to about 400 SU, less than or equal to about 350 SU, less than or equal to about 300 SU, less than or equal to about 250 SU, less than or equal to about 200 SU, less than or equal to about 150 SU, or less than or equal to about 100 SU. Combinations of the above referenced ranges are also possible (e.g., greater than or equal to about 50 SU and less than or equal to about 470 SU, greater than or equal to about 100 SU and less than or equal to about 450 SU). The roughness may be determined using the Sheffield smoothness test. In some embodiments, the Sheffield smoothness test may be used to measure macroscale roughness. Briefly, the Smoothness tester measures the smoothness of paper and paperboard by flowing air between the test specimen and two pressurized concentric annular lands contacting the top side of the specimen. The units are Sheffield Units (SU). A 16 square inch square sample is mounted on the base of the machine in between annular rings and the measuring head is lowered on the top of the sample. Air is provided to the sample between the annular rings. The amount of air which flows from between the rings and the sample surface (flow rate) is an indirect measurement of surface smoothness.

In some embodiments, the roughness of a surface of a layer may be greater than or equal to about 1 micron, greater than or equal to about 2 microns, greater than or equal to about 3 microns, greater than or equal to about 4 microns, greater than or equal to about 5 microns, greater than or equal to about 6 microns, greater than or equal to about 8 microns, greater than or equal to about 10 microns, or greater than or equal to about 12 microns. In some instances, the roughness of a layer may be less than or equal to about 15 microns, less than or equal to about 14 microns, less than or equal to about 12 microns, less than or equal to about 10 microns, less than or equal to about 8 microns, less than or equal to about 6 microns, less than or equal to about 5 microns, less than or equal to about 4 microns, or less than or equal to about 3 microns. Combinations of the above referenced ranges are also possible (e.g., greater than or equal to about 1 micron and less than or equal to about 15 microns, greater than or equal to about 2 microns and less than or equal to about 14 microns). The roughness may be determined using the Parker Print-Surf (PPS) test. In some embodiments, the Parker Print-Surf (PPS) test may be used to measure macroscale roughness. Briefly, the Parker Print-Surf (PPS) tester is an air leak tester where the roughness is a function of clamping pressure. The instrument contains an internal gas flow restrictor whose pressure drop versus flow characteristics is closely controlled. The air flow is calculated by comparing the pressure drop across the measuring head and the paper test surface with that across the flow restrictor. In this test, the PPS roughness values were recorded at 1000 kPa on a 16 square inch sample. The PPS tester allows the roughness of paper to be expressed in geometrical units (in this case micron) uses high clamping pressures and uses a narrow metering land to prevent air from flowing through inside the paper or leaking out from the backside.

As described herein, in some embodiments, the surface may be modified to be hydrophilic. As used herein, the term "hydrophilic" may refer to material that has a water contact angle of less than 90 degrees. Accordingly, a "hydrophilic surface" may refer to a surface that has a water contact angle of less than 90 degrees. In some embodiments, the surface may be modified to be hydrophilic such that the water contact angle is less than 90 degrees, less than or equal to about 80 degrees, less than or equal to about 75 degrees, less than or equal to about 70 degrees, less than or equal to about 65 degrees, less than or equal to about 60 degrees, less than or equal to about 55 degrees, less than or equal to about 50 degrees, less than or equal to about 45 degrees, less than or equal to about 40 degrees, less than or equal to about 35 degrees, less than or equal to about 30 degrees, less than or equal to about 25 degrees, less than or equal to about 20 degrees, or less than or equal to about 15 degrees. In some embodiments, the water contact angle is greater than or equal to about 0 degrees, greater than or equal to about 5 degrees, greater than or equal to about 10 degrees, greater than or equal to about 15 degrees, greater than or equal to about 20 degrees, greater than or equal to about 25 degrees, greater than or equal to about 35 degrees, greater than or equal to about 45 degrees, or greater than or equal to about 60 degrees. Combinations of the above-referenced ranges are also possible (e.g., greater than or equal to about 0 degrees and less than 90 degrees, greater than or equal to about 0 degrees and less than about 60 degrees). The water contact angle may be measured using ASTM D5946-04. The contact angle is the angle between the substrate surface and the tangent line drawn to the water droplet surface at the three-phase point, when a liquid drop is resting on a plane solid surface. A contact angle meter or goniometer can be used for this determination As described herein, in some embodiments, the surface may be modified to be hydrophobic. As used herein, the term "hydrophobic" may refer to material that has a water contact angle of greater than or equal to 90 degrees (e.g., greater than or equal to 120 degrees, greater than or equal to 150 degrees). Accordingly, a "hydrophobic surface" may refer to a surface that has a water contact angle of greater than 90 degrees. In some embodiments, the surface may be modified to be hydrophobic such that the water contact angle is greater than 90 degrees, greater than or equal to 100 degrees, greater than or equal to 105 degrees, greater than or equal to 110 degrees, greater than or equal to 115 degrees, greater than or equal to 120 degrees, greater than or equal to 125 degrees, greater than or equal to 130 degrees, greater than or equal to 135 degrees, greater than or equal to 145 degrees, greater than or equal to 150 degrees, greater than or equal to 155 degrees, or greater than or equal to 160 degrees. In some such embodiments, the surface may have a contact angle greater than or equal to about 150 degrees. In some instances, the water contact angle is less than or equal to about 180 degrees, less than or equal to about 175 degrees, less than or equal to about 165 degrees, less than or equal to about 150 degrees, less than or equal to about 135 degrees, less than or equal to about 120 degrees, or less than or equal to about 105 degrees. Combinations of the above-referenced ranges are also possible (e.g., greater than or equal to 90 degrees and less than about 180 degrees, greater than or equal to about 105 degrees and less than about 180 degrees).

In some embodiments, the molecular weight of a molecule used to modify the surface of a layer may be greater than or equal to 2 g/mol, greater than or equal to 10 g/mol, greater than or equal to 16 g/mol, greater than or equal to 20 g/mol, greater than or equal to 50 g/mol, greater than or equal to 100 g/mol, greater than or equal to 300 g/mol, greater than or equal to 500 g/mol, greater than or equal to 1,000 g/mol, greater than or equal to 5,000 g/mol, greater than or equal to 10,000 g/mol, greater than or equal to 50,000 g/mol, greater than or equal to 100,000 g/mol, greater than or equal to 250,000 g/mol, greater than or equal to 500,000 g/mol, or greater than or equal to 750,000 g/mol. In some instances, the molecular weight of a molecule used to modify the surface of a layer may be less than or equal to about 1,000,000 g/mol, less than or equal to about 750,000 g/mol, less than or equal to about 500,000 g/mol, less than or equal to about 250,000 g/mol, less than or equal to about 100,000 g/mol, less than or equal to about 50,000 g/mol, less than or equal to about 25,000 g/mol, less than or equal to about 10,000 g/mol, less than or equal to about 5,000 g/mol, less than or equal to about 1,000 g/mol, less than or equal to about 500 g/mol, less than or equal to about 200 g/mol, less than or equal to about 100 g/mol, or less than or equal to about 50 g/mol. Combinations of the above-referenced ranges are also possible (e.g., a molecular weight of greater than or equal to about 2 g/mol and less than about 1,000,000 g/mol, a molecular weight of greater than or equal to about 16 g/mol and less than about 1,000,000 g/mol, a molecular weight of greater than or equal to about 10 g/mol and less than about 1,000 g/mol, a molecular weight of greater than or equal to about 20 g/mol and less than about 1,000 g/mol). Other ranges are also possible. It should understood that the molecular weight for polymers refers to the number average molecular weight.

In general the weight percent of the material used to modify at least one surface of a layer may be greater than or equal to about 0.0001 wt %, greater than or equal to about 0.0005 wt %, greater than or equal to about 0.001 wt %, greater than or equal to about 0.005 wt %, greater than or equal to about 0.01 wt %, greater than or equal to about 0.05 wt %, greater than or equal to about 0.1 wt %, greater than or equal to about 0.5 wt %, greater than or equal to about 1 wt %, greater than or equal to about 2 wt %, greater than or equal to about 4 wt %, greater than or equal to about 6 wt %, or greater than or equal to about 8 wt % with respect to the total weight of the layer. In some cases, the weight percentage of the material used to modify at least one surface of a layer may be less than or equal to about 10 wt %, less than or equal to about 8 wt %, less than or equal to about 5 wt %, less than or equal to about 3 wt %, less than or equal to about 1 wt %, less than or equal to about 0.5 wt %, less than or equal to about 0.1 wt %, less than or equal to about 0.05 wt %, less than or equal to about 0.01 wt %, or less than or equal to about 0.005 wt % with respect to the total weight of the layer. Combinations of the above-referenced ranges are also possible (e.g., a weight percentage of material of greater than or equal to about 0.0001 wt % and less than about 10 wt %, greater than or equal to about 0.0001 wt % and less than about 5 wt %). Other ranges are also possible. The weight percentage of material in a layer (e.g., surface modified) is based on the dry solids of the layer.

The relative hydrophobicity or hydrophilicity of a surface can also be determined before and after surface modification using the isopropyl alcohol (IPA)/Water Rank test. The (IPA)/Water Rank test is a modified AATCC TM 193 test. To perform the test, a droplet size of 10 μL can be used while the temperature is controlled to be between 60 to 80° F. The IPA/water rank can be performed by, beginning with the lowest numbered test liquid (see Table 2), placing one drop of test liquid onto three locations on the surface of the surface modified web. This process is repeated with higher numbered liquids until the highest number was reached that did not spread on or wick into the surface after 10 seconds. A rank of −1 indicates that the surface is hydrophilic, e.g., water droplets spread and completely penetrated into the fiber web. A rank of 0 or higher indicates that the surface is hydrophobic, with the highest value (e.g., 19) indicating a higher degree of hydrophobicity than the lower values.

TABLE 2

Liquids used for IPA/Water Rank

| IPA/Water Rank Test# | % IPA | % Water | dyn/cm |
|---|---|---|---|
| −1 | | | |
| 0 | 0 | 100 | 72 |
| 1 | 2 | 98 | 71.0 |
| 2 | 5 | 95 | 69.5 |
| 3 | 10 | 90 | 67.0 |
| 4 | 15 | 85 | 64.5 |
| 5 | 20 | 80 | 61.9 |
| 6 | 25 | 75 | 59.4 |
| 7 | 30 | 70 | 56.9 |
| 8 | 35 | 65 | 54.4 |
| 9 | 40 | 60 | 51.9 |
| 10 | 50 | 50 | 46.9 |
| 11 | 60 | 40 | 41.8 |
| 12 | 70 | 30 | 36.8 |
| 13 | 75 | 25 | 34.3 |
| 14 | 80 | 20 | 31.8 |
| 15 | 85 | 15 | 29.2 |
| 16 | 90 | 10 | 26.7 |
| 17 | 95 | 5 | 24.2 |

TABLE 2-continued

Liquids used for IPA/Water Rank

| IPA/Water Rank Test# | % IPA | % Water | dyn/cm |
|---|---|---|---|
| 18 | 98 | 2 | 22.7 |
| 19 | 100 | 0 | 21.7 |

In some embodiments, a layer described herein (e.g., a surface modified layer) may have an IPA/Water rank of at least 1, at least 3, at least 5, at least 8, at least 12, at least 15, or at least 17. The layer may have an IPA/Water rank of less than or equal to 19, less than or equal to 16, less than or equal to 12, less than or equal to 8, less than or equal to 5, or less than or equal to 3. Combinations of the above-referenced ranges are also possible.

A layer, such as a surface modified layer described herein, may have certain performance characteristics such as air permeability. For instance, in some embodiments, a layer (e.g., a surface modified layer) may have an air permeability of greater than or equal to about 0.1 CFM, greater than or equal to about 0.3 CFM, greater than or equal to about 0.5 CFM, greater than or equal to about 2 CFM, greater than or equal to about 5 CFM, greater than or equal to about 10 CFM, greater than or equal to about 25 CFM, greater than or equal to about 50 CFM, greater than or equal to about 100 CFM, greater than or equal to about 200 CFM, greater than or equal to about 300 CFM, greater than or equal to about 400 CFM, greater than or equal to about 500 CFM, greater than or equal to about 600 CFM, or greater than or equal to about 700 CFM. In some instances, a layer (e.g., a surface modified layer) may have an air permeability of less than or equal to about 800 CFM, less than or equal to about 700 CFM, less than or equal to about 600 CFM, less than or equal to about 500 CFM, less than or equal to about 400 CFM, less than or equal to about 300 CFM, less than or equal to about 200 CFM, less than or equal to about 100 CFM, less than or equal to about 50 CFM, less than or equal to about 25 CFM, less than or equal to about 10 CFM, less than or equal to about 5 CFM, less than or equal to about 1 CFM, or less than or equal to about 0.3 CFM. Combinations of the above-referenced ranges are also possible (e.g., greater than or equal to about 0.5 CFM and less than or equal to about 800 CFM, greater than or equal to about 2 CFM and less than or equal to about 400 CFM). Other values of air permeability are also possible. The air permeability may be determined according to the standard TAPPI T-251 using a test area of 38 cm$^2$ and a pressure drop of 125 Pa (0.5 inches of water).

The mean flow pore size may be selected as desired. For instance, in some embodiments, a layer (e.g., surface modified layer) may have a mean flow pore size of greater than or equal to about 0.1 microns, greater than or equal to about 1 microns, greater than or equal to about 2 microns, greater than or equal to about 5 microns, greater than or equal to about 10 microns, greater than or equal to about 20 microns greater than or equal to about 30 microns, greater than or equal to about 40 microns, or greater than or equal to about 50 microns. In some instances, a layer (e.g., surface modified layer) may have a mean flow pore size of less than or equal to about 60 microns, less than or equal to about 50 microns, less than or equal to about 40 microns, less than or equal to about 30 microns, less than or equal to about 20 microns, less than or equal to about 10 microns or less than or equal to about 5 microns. Combinations of the above-referenced ranges are also possible (e.g., greater than or equal to about 0.1 microns and less than or equal to about 60 microns, greater than or equal to about 0.1 microns and less than or equal to about 30 microns). Other values of mean flow pore size are also possible. The mean flow pore size may be determined according to the standard ASTM E1294 (2008) (M.F.P.).

A layer, such as a surface modified layer described herein, may have certain structural characteristics such as basis weight and thickness. For instance, in some embodiments, a layer (e.g., surface modified layer) may have a basis weight of greater than or equal to about 0.01 g/m$^2$, greater than or equal to about 0.05 g/m$^2$, greater than or equal to about 0.1 g/m$^2$, greater than or equal to about 1 g/m$^2$, greater than or equal to about 5 g/m$^2$, greater than or equal to about 10 g/m$^2$, greater than or equal to about 20 g/m$^2$, greater than or equal to about 30 g/m$^2$, greater than or equal to about 50 g/m$^2$, greater than or equal to about 60 g/m$^2$, greater than or equal to about 80 g/m$^2$, greater than or equal to about 100 g/m$^2$, greater than or equal to about 200 g/m$^2$, greater than or equal to about 300 g/m$^2$, or greater than or equal to about 400 g/m$^2$. In some instances, layer (e.g., a surface modified layer) may have a basis weight of less than or equal to about 500 g/m$^2$, less than or equal to about 400 g/m$^2$, less than or equal to about 300 g/m$^2$, less than or equal to about 200 g/m$^2$, less than or equal to about 100 g/m$^2$, less than or equal to about 80 g/m$^2$, less than or equal to about 60 g/m$^2$, less than or equal to about 50 g/m$^2$, less than or equal to about 40 g/m$^2$, less than or equal to about 30 g/m$^2$, less than or equal to about 20 g/m$^2$, less than or equal to about 10 g/m$^2$, less than or equal to about 5 g/m$^2$, less than or equal to about 1 g/m$^2$, or less than or equal to about 0.5 g/m$^2$ Combinations of the above-referenced ranges are also possible (e.g., greater than or equal to about 10 g/m$^2$ and less than or equal to about 100 g/m$^2$, greater than or equal to about 1 g/m$^2$ and less than or equal to about 60 g/m$^2$). Other values of basis weight are also possible. The basis weight may be determined according to the standard TAPPI T-410.

In some embodiments, the thickness of a layer (e.g., surface modified layer) may be greater than or equal to about 0.0002 mm, greater than or equal to about 0.0005 mm, greater than or equal to 0.001 mm, greater than or equal to about 0.005 mm, greater than or equal to about 0.01 mm, greater than or equal to 0.05 mm, greater than or equal to about 0.1 mm, greater than or equal to about 0.5 mm, greater than or equal to about 1 mm, greater than or equal to about 1.5 mm, greater than or equal to about 2 mm, greater than or equal to about 2.5 mm, greater than or equal to about 3 mm, greater than or equal to about 4 mm, greater than or equal to about 5 mm, greater than or equal to about 6 mm, greater than or equal to about 7 mm, or greater than or equal to about 8 mm. In some instances, the thickness of the layer (e.g., surface modified layer) may be less than or equal to about 10 mm, less than or equal to about 9 mm, less than or equal to about 8 mm, less than or equal to about 6 mm, less than or equal to about 5 mm, less than or equal to about 4 mm, less than or equal to about 3 mm, less than or equal to about 2.5 mm, less than or equal to about 2 mm, less than or equal to about 1.5 mm, less than or equal to about 1 mm, less than or equal to about 0.5 mm, less than or equal to about 0.1 mm, less than or equal to about 0.05 mm, less than or equal to about 0.01 mm, less than or equal to about 0.005 mm, less than or equal to about 0.001 mm, or less than or equal to about 0.0005 mm. Combinations of the above-referenced ranges are possible (e.g., greater than or equal to about 0.05 mm and less than or equal to about 10 mm, greater than or equal to about 0.05 mm and less than or equal to about 3 mm, greater than or equal to about 0.05 mm and less than or equal to about 2.5 mm). Other values of thickness are possible. The thickness of media layer may be determined according to the standard TAPPI T411.

The filter media, as described herein, may have advantageous performance properties, including particle efficiency, air permeability, pressure drop, and dust holding capacity. In some embodiments, the surface modified layers may serve to increase the overall average fluid separation efficiency of the filter media and/or a filter arrangement comprising the surface modified layer. Regardless of the fluid to be separated, in some embodiments, the average fluid (e.g., fuel-water) separation efficiency may range from about 20% to about 99% or higher (e.g., between about 30% to about 99%, between about 60% to about 99%). For instance, in certain embodiments, the average fluid separation efficiency may be at least about 20%, at least about 30%, at least about 40%, at least about 50%, at least about 60%, at least about 70%, at least about 80%, at least about 90%, at least about 95%, at least about 98%, at least about 99%, or at least about 99%. In some instances, the average fluid separation efficiency may be less than or equal to about 99.9%, less than or equal to about 99% less than or equal to about 99.9%, less than or equal to about 99%, less than or equal to about 98%, or less than or equal to about 95%. Combinations of the above-referenced ranges are possible (e.g., at least about 60% and less than or equal to about 99%). Other ranges are also possible.

In certain embodiments, the initial fluid separation efficiency may be at least about 20%, at least about 30%, at least about 40%, at least about 50%, at least about 60%, at least about 70%, at least about 80%, at least about 90%, at least about 95%, at least about 98%, at least about 99%, or at least about 99.9%. In some instances, the initial fluid separation efficiency may be less than or equal to about 99.9%, less than or equal to about 99%, less than or equal to about 98%, or less than or equal to about 95%. Combinations of the above-referenced ranges are possible (e.g., at least about 60% and less than or equal to about 99.99%). Other ranges are also possible.

As used herein, average and initial fuel-water separation efficiency is measured using the SAEJ1488 test. The test involves sending a sample of fuel (ultra-low sulfur diesel fuel) with controlled water content (2500 ppm) through a pump across the media at a face velocity of 0.069 cm/sec. The water is emulsified into fine droplets and sent to challenge the media. The water is either coalesced, or shed or both, and collects at the bottom of the housing. The water content of the sample is measured both upstream and downstream of the media, via Karl Fischer titration. The efficiency is the amount of water removed from the fuel-water mixture. The fuel-water separation efficiency is calculated as $(1-C/2500)*100$, where C is the downstream concentration of water. The initial efficiency is calculated at the first 10 minutes of the test and the average efficiency is calculated as the average of the efficiency at the end of 150 minutes. To measure average fuel-water separation efficiency as described herein, the first measurement of the sample upstream and downstream of the media is taken at 10 minutes from the start of the test. Then, measurement of the sample downstream of the media is taken every 20 minutes.

In some embodiments, higher average and initial fuel-water separation efficiencies may be achieved by using multiple layers of media described herein, by including multiple stages of filter media (e.g., multiple alternating hydrophobic and hydrophilic stages), and/or by controlling the pore size, basis weight, thickness, and/or surface chemistries of the layers and/or stages.

A filter media described herein may also have different particulate efficiencies. In a typical test for measuring particulate efficiency of the filter media (e.g., according to the standard ISO 19438), particle counts (particles per milliliter) at the particle size, x, (e.g., where x is 1, 3, 4, 5, 7, 10, 15, 20, 25, or 30 microns) upstream and downstream of the layer or media can be taken at ten points equally divided over the time of the test. Generally, a particle size of x means that x micron or greater particles will be captured by the layer or media at the given efficiency. The average of upstream and downstream particle counts can be taken at the selected particle size. From the average particle count upstream (injected $-C_0$) and the average particle count downstream (passed thru $-C$) the filtration efficiency test value for the particle size selected can be determined by the relationship $[(1-[C/C_0])*100\%]$. As described herein, efficiency can be measured according to standard ISO 19438. In some embodiments, x is 4 microns such that the below ranges of efficiency are suitable for filtering out 4 micron or larger particles. In other embodiments, the below ranges of efficiency are suitable for filtering 1, 3, 4, 5, 7, 10, 15, 20, 25, or 30 micron or larger particles.

In some embodiments, the particulate efficiency may range from about 5% to about 99.999% or higher (e.g., between about 20% to about 99.999%). For instance, in certain embodiments, the particulate efficiency may be greater than or equal to about 5%, greater than or equal to about 10%, greater than or equal to about 20%, greater than or equal to about 40%, greater than or equal to about 60%, greater than or equal to about 80%, greater than or equal to about 90%, greater than or equal to about 95%, greater than or equal to about 96%, greater than or equal to about 97%, greater than or equal to about 98%, greater than or equal to about 99%, or greater than or equal to about 99.9%. In some instances, the efficiency of the filter media may be less than or equal to about 99.999%, less than or equal to about 99.99%, less than or equal to about 98%, less than or equal to about 97%, less than or equal to about 96%, or less than or equal to about 90%. Combinations of the above-referenced ranges are also possible. Other values of the particulate efficiency of the filter media are also possible. The particulate efficiency may be determined according to standard ISO 19438.

In some embodiments, the entire filter media may have an air permeability of greater than or equal to about 0.3 CFM, greater than or equal to about 0.6 CFM, greater than or equal to about 0.8 CFM, greater than or equal to about 1 CFM, greater than or equal to about 2 CFM, greater than or equal to about 5 CFM, greater than or equal to about 10 CFM, greater than or equal to about 20 CFM, greater than or equal to about 30 CFM, greater than or equal to about 40 CFM, greater than or equal to about 50 CFM, greater than or equal to about 60 CFM, greater than or equal to about 75 CFM, or greater than or equal to about 90 CFM. In some instances, the entire filter media may have an air permeability of less than or equal to about 100 CFM, less than or equal to about 90 CFM, less than or equal to about 80 CFM, less than or equal to about 70 CFM, less than or equal to about 60 CFM, less than or equal to about 50 CFM, less than or equal to about 40 CFM, less than or equal to about 30 CFM, less than or equal to about 20 CFM, less than or equal to about 10 CFM, less than or equal to about 5 CFM, or less than or equal to about 1 CFM. Combinations of the above-referenced ranges are also possible (e.g., greater than or equal to about 2 CFM and less than or equal to about 100 CFM, greater than or equal to about 2 CFM and less than or equal to about 90 CFM). Other values of air permeability are also possible. The air permeability may be determined using TAPPI T-251.

In some embodiments, the entire filter media may have a dust holding capacity of greater than or equal to about 5 g/m², greater than or equal to about 10 g/m², greater than or equal to about 20 g/m², greater than or equal to about 50 g/m², greater than or equal to about 100 g/m², greater than or equal to about 150 g/m², greater than or equal to about 200 g/m², greater than or equal to about 250 g/m², or greater than or equal to about 300 g/m². In some instances, the dust holding capacity may be less than or equal to about 400 g/m², less than or equal to about 350 g/m², less than or equal to about 300 g/m², less than or equal to about 250 g/m², less than or equal to about 200 g/m², less than or equal to about 150 g/m², less than or equal to about 100 g/m², less than or equal to about 50 g/m², less than or equal to about 25 g/m², or less than or equal to about 10 g/m². Combinations of the above-referenced ranges are possible (e.g., greater than or equal to about 10 g/m² and less than or equal to about 350 g/m², greater than or equal to about 10 g/m² and less than or equal to about 250 g/m²). Other values of DHC are possible. The dust holding capacity may be determined using ISO 19438.

In some embodiments, the entire filter media may have a basis weight of greater than or equal to about 5 g/m², greater than or equal to about 10 g/m², greater than or equal to about 25 g/m², greater than or equal to about 50 g/m², greater than or equal to about 100 g/m², greater than or equal to about 150 g/m², greater than or equal to about 200 g/m², greater than or equal to about 250 g/m², greater than or equal to about 300 g/m², greater than or equal to about 350 g/m², greater than or equal to about 400 g/m², or greater than or equal to about 450 g/m². In some instances, the filter media may have a basis weight of less than or equal to about 500 g/m², less than or equal to about 450 g/m², less than or equal to about 400 g/m², less than or equal to about 350 g/m², less than or equal to about 300 g/m², less than or equal to about 250 g/m², less than or equal to about 200 g/m², less than or equal to about 150 g/m², less than or equal to about 100 g/m², less than or equal to about 50 g/m², less than or equal to about 25 g/m², less than or equal to about 10 g/m², or less than or equal to about 5 g/m². Combinations of the above-referenced ranges are possible (e.g., greater than or equal to about 10 g/m² and less than or equal to about 500 g/m², greater than or equal to about 20 g/m² and less than or equal to about 300 g/m²). Other values of basis weight are possible. The basis weight may be determined according to the standard TAPPI T410.

In some embodiments, the thickness of the entire filter media may be greater than or equal to about 0.02 mm, greater than or equal to about 0.05 mm, greater than or equal to about 0.1 mm, greater than or equal to about 0.2 mm, greater than or equal to about 0.5 mm, greater than or equal to about 1 mm, greater than or equal to about 3 mm, greater than or equal to about 5 mm, greater than or equal to about 8 mm, greater than or equal to about 10 mm, or greater than or equal to about 12 mm, greater than equal to 15 mm. In some instances, the thickness of the filter media may be less than or equal to about 15 mm, less than or equal to about 12 mm, less than about 10 mm, less than or equal to about 8 mm, less than or equal to about 5 mm, less than or equal to about 3 mm, less than or equal to about 1 mm, or less than or equal to about 0.5 mm. All combinations of the above-referenced ranges are possible (e.g., greater than or equal to about 0.2 mm and less than or equal to about 15 mm, greater than or equal to about 0.2 mm and less than or equal to about 3 mm). Other values of thickness of the filter media are possible. The thickness of the entire filter media may be determined according to the standard TAPPI T411.

In some embodiments, one or more layers (e.g., surface modified layers) in the filter media may include synthetic fibers. Synthetic fibers may include any suitable type of synthetic polymer. Examples of suitable synthetic fibers include staple fibers, polyesters (e.g., polyethylene terephthalate, polybutylene terephthalate), polycarbonate, polyamides (e.g., various nylon polymers), polyaramid, polyimide, polyethylene, polypropylene, polyether ether ketone, polyolefin, acrylics, polyvinyl alcohol, regenerated cellulose (e.g., synthetic cellulose such as lyocell, rayon, acrylic), polyacrylonitriles, polyvinylidene fluoride (PVDF), copolymers of polyethylene and PVDF, polyether sulfones, and combinations thereof. In some embodiments, the synthetic fibers are organic polymer fibers. Synthetic fibers may also include multi-component fibers (i.e., fibers having multiple compositions such as bicomponent fibers). The filter media, as well as each of the layers (or sub-layers) within the filter media, may also include combinations of more than one type of synthetic fiber. It should be understood that other types of synthetic fiber types may also be used.

In some embodiments, the average diameter of the synthetic fibers of one or more layers in the filter media may be, for example, greater than or equal to about 0.05 microns, greater than or equal to about 0.1 microns, greater than or equal to about 0.3 microns, greater than or equal to about 0.5 microns, greater than or equal to about 1 micron, greater than or equal to about 2 microns, greater than or equal to about 3 microns, greater than or equal to about 4 microns, greater than or equal to about 5 microns, greater than or equal to about 8 microns, greater than or equal to about 10 microns, greater than or equal to about 12 microns, greater than or equal to about 15 microns, or greater than or equal to about 20 microns. In some instances, the synthetic fibers may have an average diameter of less than or equal to about 30 microns, less than or equal to about 20 microns, less than or equal to about 15 microns, less than or equal to about 10 microns, less than or equal to about 7 microns, less than or equal to about 5 microns, less than or equal to about 4 microns, less than or equal to about 1.5 microns, less than or equal to about 1 micron, less than or equal to about 0.8 microns, or less than or equal to about 0.5 microns. Combinations of the above-referenced ranges are also possible (e.g., greater than or equal to about 1 micron and less than or equal to about 5 microns). Other values of average fiber diameter are also possible.

In some cases, the synthetic fibers may be continuous (e.g., meltblown fibers, meltspun fibers, spunbond fibers, electrospun fibers, centrifugal spun fibers, etc.). For instance, synthetic fibers may have an average length of greater than or equal to about 1 inch, greater than or equal to about 50 inches, greater than or equal to about 100 inches, greater than or equal to about 300 inches, greater than or equal to about 500 inches, greater than or equal to about 700 inches, or greater than or equal to about 900 inches. In some instances, synthetic fibers may have an average length of less than or equal to about 1000 inches, less than or equal to about 800 inches, less than or equal to about 600 inches, less than or equal to about 400 inches, or less than or equal to about 100 inches. Combinations of the above-referenced ranges are also possible (e.g., greater than or equal to about 50 inches and less than or equal to about 1000 inches). Other values of average fiber length are also possible.

In other embodiments, the synthetic fibers are not continuous (e.g., staple fibers). For instance, in some embodiments, synthetic fibers in one or more layers (or sub-layers) in the filter media may have an average length of greater than or equal to about 0.5 mm, greater than or equal to about 1 mm, greater than or equal to about 2 mm, greater than or equal to about 4 mm, greater than or equal to about 6 mm, greater than or equal to about 8 mm, greater than or equal to about 10 mm, greater than or equal to about 12 mm, or greater than or equal to about 15 mm. In some instances, synthetic fibers may have an average length of less than or equal to about 25 mm, less than or equal to about 20 mm, less than or equal to about 15 mm, less than or equal to about 12 mm, less than or equal to about 10 mm, less than or equal to about 8 mm, less than or equal to about 6 mm, less than or equal to about 4 mm, or less than or equal to about 2 mm. Combinations of the above-referenced ranges are also possible (e.g., greater than or equal to about 1 mm and less than or equal to about 4 mm). Other values of average fiber length are also possible.

In some embodiments, in which synthetic fibers are included in a layer (e.g., surface modified layer), the weight percentage of synthetic fibers in a layer (e.g., surface modified layer) may be greater than or equal to about 0.2 wt %, greater than or equal to about 0.5 wt %, greater than or equal to about 1 wt %, greater than or equal to about 2 wt %, greater than or equal to about 20 wt %, greater than or equal to about 40 wt %, greater than or equal to about 60 wt %, greater than or equal to about 80 wt %, greater than or equal to about 90 wt %, or greater than or equal to about 95 wt %. In some instances, the weight percentage of synthetic fibers in the layer may be less than or equal to about 100 wt %, less than or equal to about 98 wt %, less than or equal to about 85 wt %, less than or equal to about 75 wt %, less than or equal to about 50 wt %, less than or equal to about 25 wt %, less than or equal to about 10 wt %, or less than or equal to about 5 wt %. Combinations of the above-referenced ranges are also possible (e.g., greater than or equal to about 2 wt % and less than or equal to about 100 wt %). Other values of weight percentage of synthetic fibers in a layer (e.g., surface modified) are also possible. In some embodiments, the layer includes 100 wt % synthetic fibers. In other embodiments, the layer may include 0 wt % synthetic fibers. In some embodiments, a fiber web includes the above-noted ranges of synthetic fibers with respect to the total amount of fibers in the web.

In some embodiments, one or more layers (e.g., surface modified layers) in the filter media may include one or more cellulose fibers, such as softwood fibers, hardwood fibers, a mixture of hardwood and softwood fibers, regenerated cellulose fibers (e.g., rayon, fibrillated synthetic cellulose fibers such as Lyocell fibers), microfibrillated cellulose, and mechanical pulp fibers (e.g., groundwood, chemically treated mechanical pulps, and thermomechanical pulps). Exemplary softwood fibers include fibers obtained from mercerized southern pine (e.g., mercerized southern pine fibers or "HPZ fibers"), northern bleached softwood kraft (e.g., fibers obtained from Robur Flash ("Robur Flash fibers")), southern bleached softwood kraft (e.g., fibers obtained from Brunswick pine ("Brunswick pine fibers")), or chemically treated mechanical pulps ("CTMP fibers"). For example, HPZ fibers can be obtained from Buckeye Technologies, Inc., Memphis, Tenn.; Robur Flash fibers can be obtained from Rottneros AB, Stockholm, Sweden; and Brunswick pine fibers can be obtained from Georgia-Pacific, Atlanta, Ga. Exemplary hardwood fibers include fibers obtained from Eucalyptus ("Eucalyptus fibers"). Eucalyptus fibers are commercially available from, e.g., (1) Suzano Group, Suzano, Brazil ("Suzano fibers"), (2) Group Portucel Soporcel, Cacia, Portugal ("Cacia fibers"), (3) Tembec, Inc., Temiscaming, QC, Canada ("Tarascon fibers"), (4) Kartonimex Intercell, Duesseldorf, Germany, ("Acacia fibers"), (5) Mead-Westvaco, Stamford, Conn. ("Westvaco fibers"), and (6) Georgia-Pacific, Atlanta, Ga. ("Leaf River fibers").

The average diameter of the cellulose fibers in one or more layers in the filter media may be, for example, greater than or equal to about 1 micron, greater than or equal to about 2 microns, greater than or equal to about 3 microns, greater than or equal to about 4 microns, greater than or equal to about 5 microns, greater than or equal to about 8 microns, greater than or equal to about 10 microns, greater than or equal to about 15 microns, greater than or equal to about 20 microns, greater than or equal to about 30 microns, or greater than or equal to about 40 microns. In some instances, the cellulose fibers may have an average diameter of less than or equal to about 50 microns, less than or equal to about 40 microns, less than or equal to about 30 microns, less than or equal to about 20 microns, less than or equal to about 15 microns, less than or equal to about 10 microns, less than or equal to about 7 microns, less than or equal to about 5 microns, less than or equal to about 4 microns, or less than or equal to about 2 microns. Combinations of the above-referenced ranges are also possible (e.g., greater than or equal to about 1 micron and less than or equal to about 5 microns). Other values of average fiber diameter are also possible.

In some embodiments, the cellulose fibers may have an average length. For instance, in some embodiments, cellulose fibers may have an average length of greater than or equal to about 0.5 mm, greater than or equal to about 1 mm, greater than or equal to about 2 mm, greater than or equal to about 3 mm, greater than or equal to about 4 mm, greater than or equal to about 5 mm, greater than or equal to about 6 mm, or greater than or equal to about 8 mm. In some instances, cellulose fibers may have an average length of less than or equal to about 10 mm, less than or equal to about 8 mm, less than or equal to about 6 mm, less than or equal to about 4 mm, less than or equal to about 2 mm, or less than or equal to about 1 mm. Combinations of the above-referenced ranges are also possible (e.g., greater than or equal to about 1 mm and less than or equal to about 3 mm). Other values of average fiber length are also possible.

Regardless of the type of cellulose fibers, in some embodiments, the weight percentage of cellulose fibers in one or more layers (e.g., surface modified layers) may be greater than or equal to about 1 wt %, greater than or equal to about 5 wt %, greater than or equal to about 10 wt %, greater than or equal to about 15 wt %, greater than or equal to about 45 wt %, greater than or equal to about 65 wt %, or greater than or equal to about 90 wt %. In some instances, the weight percentage of the cellulose fibers in one or more layers may be less than or equal to about 100 wt %, less than or equal to about 85 wt %, less than or equal to about 55 wt %, less than or equal to about 20 wt %, less than or equal to about 10 wt %, or less than or equal to about 2 wt %. Combinations of the above-referenced ranges are also possible (e.g., greater than or equal to about 1 wt % and less than or equal to about 20 wt %). Other values of weight percentage of the cellulose fibers in one or more layers are also possible. In some embodiments, one or more layers include 100 wt % cellulose fibers. In other embodiments, the one or more layers may include 0 wt % cellulose fibers. In some embodiments, a fiber web includes the above-noted ranges of cellulose fibers with respect to the total amount of fibers in the web.

In embodiments in which fibrillated fibers (e.g., fibrillated regenerated cellulose (e.g., rayon, Lyocell), microfibrillated cellulose, fibrillated synthetic fibers (e.g., fibrillated fibers formed of synthetic polymers such as polyester, polyamide, polyaramid, para-aramid, meta-aramid, polyimide, polyethylene, polypropylene, polyether ether ketone, polyethylene terephthalate, polyolefin, nylon, and/or acrylics), fibrillated natural fibers (e.g., hardwood, softwood)) are included in a layer, regardless of the type of fibrillated fibers, the weight percentage of fibrillated fibers in the layer (e.g., a surface modified layer) may be greater than or equal to about 0.5 wt %, greater than or equal to about 1 wt %, greater than or equal to about 5 wt %, greater than or equal to about 10 wt %, greater than or equal to about 20 wt %, greater than or equal to about 30 wt %, greater than or equal to about 40 wt %, or greater than or equal to about 60 wt %. In some instances, the weight percentage of the fibrillated fibers in a layer (e.g., a surface modified layer) may be less than or equal to about 70 wt %, less than or equal to about 60 wt %, less than or equal to about 50 wt %, less than or equal to about 35 wt %, less than or equal to about 20 wt %, or less than or equal to about 10%. Combinations of the above-referenced ranges are also possible (e.g., greater than or equal to about 0 wt %, and less than or equal to about 50 wt %,). Other values of weight percentage of the fibrillated fibers in a layer are also possible. In some embodiments, a layer may include 0 wt %, fibrillated fibers. In some embodiments, a layer may include 100 wt %, fibrillated fibers. In some embodiments, a fiber web includes the above-noted ranges of fibrillated fibers with respect to the total amount of fibers in the web.

The level of fibrillation may be measured according to any number of suitable methods. For example, the level of fibrillation of the fibrillated fibers can be measured according to a Canadian Standard Freeness (CSF) test, specified by TAPPI test method T 227 om 09 Freeness of pulp. The test can provide an average CSF value.

In some embodiments, the average CSF value of the fibrillated fibers used in one or more layers (e.g., surface modified layers) may vary between about 10 mL and about 750 mL. In certain embodiments, the average CSF value of the fibrillated fibers used one or more layers may be greater than or equal to 1 mL, greater than or equal to about 10 mL, greater than or equal to about 20 mL, greater than or equal to about 35 mL, greater than or equal to about 45 mL, greater than or equal to about 50 mL, greater than or equal to about 65 mL, greater than or equal to about 70 mL, greater than or equal to about 75 mL, greater than or equal to about 80 mL, greater than or equal to about 100 mL, greater than or equal to about 150 mL, greater than or equal to about 175 mL, greater than or equal to about 200 mL, greater than or equal to about 250 mL, greater than or equal to about 300 mL, greater than or equal to about 350 mL, greater than or equal to about 500 mL, greater than or equal to about 600 mL, greater than or equal to about 650 mL, greater than or equal to about 700 mL, or greater than or equal to about 750 mL.

In some embodiments, the average CSF value of the fibrillated fibers used in one or more layers may be less than or equal to about 800 mL, less than or equal to about 750 mL, less than or equal to about 700 mL, less than or equal to about 650 mL, less than or equal to about 600 mL, less than or equal to about 550 mL, less than or equal to about 500 mL, less than or equal to about 450 mL, less than or equal to about 400 mL, less than or equal to about 350 mL, less than or equal to about 300 mL, less than or equal to about 250 mL, less than or equal to about 225 mL, less than or equal to about 200 mL, less than or equal to about 150 mL, less than or equal to about 100 mL, less than or equal to about 90 mL, less than or equal to about 85 mL, less than or equal to about 70 mL, less than or equal to about 50 mL, less than or equal to about 40 mL, or less than or equal to about 25 mL. Combinations of the above-referenced ranges are also possible (e.g., greater than or equal to about 10 mL and less than or equal to about 300 mL). Other ranges are also possible. The average CSF value of the fibrillated fibers used in one or more layers may be based on one type of fibrillated fiber or more than one type of fibrillated fiber.

In some embodiments, one or more layers (e.g., surface modified layers) in the filter media may include glass fibers (e.g., microglass fibers, chopped strand glass fibers, or a combination thereof). Microglass fibers may be fine or coarse. As used herein, fine microglass fibers are less than or equal to 1 micron in diameter and coarse microglass fibers are greater than or equal to 1 micron in diameter. In general, chopped strand glass fibers may have an average fiber diameter that is greater than the diameter of the microglass fibers.

In some embodiments, the average diameter of glass fibers may be less than or equal to about 30 microns, less than or equal to about 25 microns, less than or equal to about 15 microns, less than or equal to about 12 microns, less than or equal to about 10 microns, less than or equal to about 9 microns, less than or equal to about 7 microns, less than or equal to about 5 microns, less than or equal to about 3 microns, or less than or equal to about 1 micron. In some instances, the glass fibers may have an average fiber diameter of greater than or equal to about 0.1 microns, greater than or equal to about 0.3 microns, greater than or equal to about 1 micron, greater than or equal to about 3 microns, or greater than equal to about 7 microns greater than or equal to about 9 microns, greater than or equal to about 11 microns, or greater than or equal to about 20 microns. Combinations of the above-referenced ranges are also possible (e.g., greater than or equal to about 0.1 microns and less than or equal to about 9 microns). Other values of average fiber diameter are also possible.

In some embodiments, glass fibers may have a length in the range of between about 0.08 inches and about 1 inch (e.g., about 0.125 inches and about 1 inches, about 0.25 inches, or about 0.5 inches). In some embodiments, the average length of chopped strand glass fibers may be less than or equal to about 1 inch, less than or equal to about 0.8 inches, less than or equal to about 0.6 inches, less than or equal to about 0.5 inches, less than or equal to about 0.4 inches, less than or equal to about 0.3 inches, less than or equal to about 0.2 inches, less than or equal to about 0.1 inches, or less than or equal to about 0.08 inches. In certain embodiments, the average length of chopped strand glass fibers may be greater than or equal to about 0.06 inches, greater than or equal to about 0.08 inches, greater than or equal to about 0.1 inches, greater than or equal to about 0.125 inches, greater than or equal to about 0.2 inches, greater than or equal to about 0.4 inches, greater than or equal to about 0.5 inches, greater than equal to about 0.6 inches, or greater than or equal to about 0.8 inches. Combinations of the above referenced ranges are also possible (e.g., glass fibers having an average length of greater than or equal to about 0.125 inches and less than about 1 inch or greater than or equal to about 0.1 inches and less than about 0.3 inches). Other ranges are also possible.

In some embodiments, a surface modified layer is substantially free of glass fibers (e.g., less than 1 wt % glass fibers). For instance, the layer may include 0 wt % glass fibers. In certain embodiments, the use of glass fibers in a layer (although advantageous for promoting hydrophilicity) may be avoided by modifying a surface of the layer to impart hydrophilicity to the surface, as described herein. Filter media and arrangements that are substantially free of glass fibers may be advantageous for certain applications (e.g., fuel-water separation, particulate separation in fuel systems), since glass fibers may shed and leach sodium ions (e.g., $Na^+$) which can lead to physical abrasion and soap formation. For example, shedding of glass fibers may lead to the blockage of fuel injectors such as in high pressure common rail applications. In other embodiments, a layer (e.g., a surface modified layer) may optionally include glass fibers (e.g., microglass and/or chopped glass fibers). For instance, in some embodiments, the weight percentage of the glass fibers may be greater than or equal to about 0 wt %, greater than or equal to about 10 wt %, greater than or equal to about 25 wt %, greater than or equal to about 50 wt %, or greater than or equal to about 75 wt %. In some instances, the weight percentage of the glass fibers in the layer may be less than or equal to about 100 wt %, less than or equal to about 75 wt %, less than or equal to about 50 wt %, less than or equal to about 25 wt %, less than or equal to about 5 wt %, or less than or equal to about 2 wt %. Combinations of the above-referenced ranges are also possible (e.g., greater than or equal to about 0 wt % and less than or equal to about 50 wt %). Other values of weight percentage of the glass in a layer are also possible. In some embodiments, a layer includes 100 wt % glass fibers. In some embodiments, a fiber web includes the above-noted ranges of glass fibers with respect to the total amount of fibers in the web.

Fiber webs described herein may be used in an overall filtration arrangement or filter element. In some embodiments, the media layers may be pleated, wrapped with or without a core, wrapped around a pleated media in a fuel water separator. In certain embodiments, a collection bowl or other suitable component may be positioned upstream, downstream, or both upstream and downstream of the media. A collection bowl is a vessel that is used to collect water after it is shed/separated/coalesced from the media. The collection bowl may be part of the filter element or filter housing.

In some embodiments, one or more additional layers or components are included with the fiber web (e.g., disposed adjacent to the fiber web, contacting one or both sides of the fiber web). Non-limiting examples of additional layers include a meltblown layer, a wet laid layer, a coarse fiber electret media, a spunbond layer, carded layer, air-laid layer, spunlace layer, or an electrospun layer. The additional layer may be surface modified, or unmodified. In some embodiments, multiple fiber webs in accordance with embodiments described herein may be layered together in forming a multi-layer sheet for use in a filter media or element.

As described herein, in some embodiments two or more layers of a web may be formed separately, and combined by any suitable method such as lamination, collation, or by use of adhesives. The two or more layers may be formed using different processes, or the same process. For example, each of the layers may be independently formed by a wet laid process, a non-wet laid process (e.g., meltblown process, melt spinning process, centrifugal spinning process, electrospinning process, dry laid process, air laid process), or any other suitable process.

In some embodiments, two or more layers may be formed by the same process. In some instances, the two or more layers may be formed simultaneously.

Different layers may be adhered together by any suitable method. For instance, layers may be adhered by an adhesive and/or melt-bonded to one another on either side. Lamination and calendering processes may also be used. In some embodiments, an additional layer may be formed from any type of fiber or blend of fibers via an added headbox or a coater and appropriately adhered to another layer.

A fiber web or filter media may include any suitable number of layers, e.g., at least 2, at least 3, at least 4, at least 5, at least 6, at least 7 layers. In some embodiments, a fiber web or filter media may include up to 20 layers.

In certain embodiments, a fiber web may include a gradient in one or more properties through portions of the thickness of the fiber web. In the portions of the fiber web where the gradient in the property is not present, the property may be substantially constant through that portion of the web. As described herein, in some instances a gradient in a property involves different proportions of a component (e.g., a type of fiber such as a fibrillated fiber, a material used for modifying the surface of a layer, an additive, a binder) across the thickness of a fiber web. In some embodiments, a component may be present at an amount or a concentration that is different than another portion of the fiber web. In other embodiments, a component is present in one portion of the fiber web, but is absent in another portion of the fiber web. Other configurations are also possible.

In some embodiments, a fiber web has a gradient in one or more properties in two or more regions of the fiber web. For example, a fiber web including three layers may have a first gradient in one property across the first and second layer, and a second gradient in another property across the second and third layers. The first and second gradients may be the same in some embodiments, or different in other embodiments (e.g., characterized by a gradual vs. an abrupt change in a property across the thickness of the fiber web). Other configurations are also possible.

Fiber webs described herein may be produced using suitable processes, such as using a wet laid or a non-wet laid process. In general, a wet laid process involves mixing together of fibers of one or more type; for example, cellulose fibers of one type may be mixed together with cellulose fibers of another type, and/or with fibers of a different type (e.g., synthetic fibers and/or glass fibers), to provide a fiber slurry. The slurry may be, for example, an aqueous-based slurry. In certain embodiments, fibers, are optionally stored separately, or in combination, in various holding tanks prior to being mixed together (e.g., to achieve a greater degree of uniformity in the mixture).

For instance, a first fiber may be mixed and pulped together in one container and a second fiber may be mixed and pulped in a separate container. The first fibers and the second fibers may subsequently be combined together into a single fibrous mixture. Appropriate fibers may be processed through a pulper before and/or after being mixed together. In some embodiments, combinations of fibers are processed through a pulper and/or a holding tank prior to being mixed together. It can be appreciated that other components may also be introduced into the mixture. Furthermore, it should be appreciated that other combinations of fibers types may be used in fiber mixtures, such as the fiber types described herein.

In certain embodiments, a media including two or more layers or phases, such as a dual phase media, is formed by a wet laid process. For example, a first dispersion (e.g., a pulp) containing fibers in a solvent (e.g., an aqueous solvent such as water) can be applied onto a wire conveyor in a papermaking machine (e.g., a fourdrinier or a rotoformer) to form first layer supported by the wire conveyor. A second dispersion (e.g., another pulp) containing fibers in a solvent (e.g., an aqueous solvent such as water) is applied onto the first layer or phase either at the same time or subsequent to deposition of the first layer or phase on the wire. Vacuum is continuously applied to the first and second dispersions of fibers during the above process to remove the solvent from the fibers, thereby resulting in an article containing first and second layers or phases. The article thus formed is then dried and, if necessary, further processed (e.g., calendered) by using known methods to form multi-layered fiber webs. In some embodiments, such a process may result in a gradient in at least one property across the thickness of the two or more layers or phases. In certain embodiments, a clear demarcation of layers is not apparent in a dual phase media. For example, intermingling of fibers between two layers or phases may be present.

Any suitable method for creating a fiber slurry may be used. In some embodiments, further additives are added to the slurry to facilitate processing. The temperature may also be adjusted to a suitable range, for example, between 33° F. and 100° F. (e.g., between 50° F. and 85° F.). In some cases, the temperature of the slurry is maintained. In some instances, the temperature is not actively adjusted.

In some embodiments, the wet laid process uses similar equipment as in a conventional papermaking process, for example, a hydropulper, a former or a headbox, a dryer, and an optional converter. A fiber web can also be made with a laboratory handsheet mold in some instances. As discussed above, the slurry may be prepared in one or more pulpers. After appropriately mixing the slurry in a pulper, the slurry may be pumped into a headbox where the slurry may or may not be combined with other slurries. Other additives may or may not be added. The slurry may also be diluted with additional water such that the final concentration of fiber is in a suitable range, such as for example, between about 0.1% and 0.5% by weight.

Wet laid processes may be particularly suitable for forming gradients of one or more properties in a fiber web, such as those described herein. For instance, in some cases, the same slurry is pumped into separate headboxes to form different layers and/or a gradient in a fiber web. In other cases, two or more different slurries may be pumped into separate headboxes to form different layers and/or a gradient in a fiber web. For laboratory samples, a first layer can be formed from a fiber slurry, drained and dried and then a second layer can be formed on top from a fiber slurry. In other embodiments, a first layer can be formed and a second layer can be formed on top, drained, and dried.

In some cases, the pH of the fiber slurry may be adjusted as desired. For instance, fibers of the slurry may be dispersed under generally neutral conditions.

Before the slurry is sent to a headbox, the slurry may optionally be passed through centrifugal cleaners and/or pressure screens for removing unfiberized material. The slurry may or may not be passed through additional equipment such as refiners or deflakers to further enhance the dispersion of the fibers. For example, deflakers may be useful to smooth out or remove lumps or protrusions that may arise at any point during formation of the fiber slurry. Fibers may then be collected on to a screen or wire at an appropriate rate using any suitable equipment, e.g., a fourdrinier, a rotoformer, a cylinder, or an inclined wire fourdrinier.

As described herein, in some embodiments, a resin is added to a fiber layer (e.g., a pre-formed fiber web formed by a wet-laid process). For instance, as the fiber layer is passed along an appropriate screen or wire, different components included in the resin (e.g., polymeric binder, an acid scavenger, and/or other components), which may be in the form of separate emulsions, are added to the fiber layer using a suitable technique. In some cases, each component of the resin is mixed as an emulsion prior to being combined with the other components and/or fiber layer. The components included in the resin may be pulled through the fiber layer using, for example, gravity and/or vacuum. In some embodiments, one or more of the components included in the resin may be diluted with softened water and pumped into the fiber layer. In some embodiments, a resin may be applied to a fiber slurry prior to introducing the slurry into a headbox. For example, the resin may be introduced (e.g., injected) into the fiber slurry and impregnated with and/or precipitated on to the fibers. In some embodiments, a resin may be added to a fiber web by a solvent saturation process.

In other embodiments, a non-wet laid process (e.g., a dry laid process, an air laid process, a spinning process such as electrospinning or centrifugal spinning, a meltblown process) is used to form all or portions of a fiber web. For example, in an air laid process, synthetic fibers may be mixed along with cellulose fibers, while air is blown onto a conveyor, and a resin is then applied. In a carding process, in some embodiments, the fibers are manipulated by rollers and extensions (e.g., hooks, needles) associated with the rollers prior to application of the binder. In some cases, forming the fiber webs through a non-wet laid process may be more suitable for the production of a highly porous media. The dry fiber web may be impregnated (e.g., via saturation, spraying, etc.) with any suitable resin, as discussed above.

During or after formation of a fiber web, the fiber web may be further processed according to a variety of known techniques. For instance, a coating method described herein may be used to include a resin in the fiber web. Additionally or alternatively, a coating or other method may be used to modify a surface of a layer as described herein. Optionally, additional layers can be formed and/or added to a fiber web using processes such as lamination, co-pleating, or collation. For example, in some cases, two layers are formed into a composite article by a wet laid process as described above, and the composite article is then combined with a third layer by any suitable process (e.g., lamination, co-pleating, or collation). It can be appreciated that a fiber web or a composite article formed by the processes described herein may be suitably tailored not only based on the components of each fiber layer, but also according to the effect of using multiple fiber layers of varying properties in appropriate combination to form fiber webs having the characteristics described herein.

In some embodiments, further processing may involve pleating the fiber web. For instance, two layers may be joined by a co-pleating process. In some cases, the fiber web, or various layers thereof, may be suitably pleated by forming score lines at appropriately spaced distances apart from one another, allowing the fiber web to be folded. In some cases, the filter media may be wrapped around each other around a core, or one layer can be wrapped around a pleated layer. It should be appreciated that any suitable pleating technique may be used.

In some embodiments, a fiber web can be post-processed such as subjected to a corrugation process to increase surface area within the web. In other embodiments, a fiber web may be embossed.

It should be appreciated that the fiber web may include other parts in addition to the one or more layers described herein. In some embodiments, further processing includes incorporation of one or more structural features and/or stiffening elements. For instance, the fiber web may be combined with additional structural features such as polymeric and/or metallic meshes. In one embodiment, a screen backing may be disposed on the fiber web, providing for further stiffness. In some cases, a screen backing may aid in retaining the pleated configuration. For example, a screen backing may be an expanded metal wire or an extruded plastic mesh.

In some embodiments, a fiber web described herein may be a non-woven web. A non-woven web may include non-oriented fibers (e.g., a random arrangement of fibers within the web). Examples of non-woven webs include webs made by wet-laid or non-wet laid processes as described herein. Non-woven webs also include papers such as cellulose-based webs.

In some embodiments, fiber webs used as filter media can be incorporated into a variety of filter elements for use in various filtering applications. Exemplary types of filters include hydraulic mobile filters, hydraulic industrial filters, fuel filters (e.g., automotive fuel filters), oil filters (e.g., lube oil filters or heavy duty lube oil filters), chemical processing filters, industrial processing filters, medical filters (e.g., filters for blood), air filters, and water filters. In some cases, filter media described herein can be used as coalescer filter media. The filter media may be suitable for filtering gases or liquids.

The fiber webs and filter media disclosed herein can be incorporated into a variety of filter elements for use in various applications including hydraulic and non-hydraulic filtration applications including fuel applications, lube applications, air applications, amongst others. Exemplary uses of hydraulic filters (e.g., high-, medium-, and low-pressure filters) include mobile and industrial filters.

During use, the fiber webs mechanically trap particles on or in the layers as fluid flows through the filter media. The fiber webs need not be electrically charged to enhance trapping of contamination. Thus, in some embodiments, the filter media are not electrically charged. However, in some embodiments, the filter media may be electrically charged.

EXAMPLES

The following examples are intended to illustrate certain embodiments of the present invention, but are not to be construed as limiting and do not exemplify the full scope of the invention.

Example 1

This example describes a filter media as in FIG. 2 and Construct 1 of Table 1. The filter media was designed to shed water from a low interfacial tension fuel-water mixture (e.g. 15-19 dynes/cm) and contained three hydrophobic surface modified layers arranged such that the air permeability of the hydrophobic surface modified layers decreased from upstream to downstream. The surface modification enhanced the natural hydrophobicity of the layers. The filter media had a relatively high initial and average fuel-water separation efficiency and was able to shed water droplets having a variety of diameters.

The filter media was formed by laminating three surface modified meltblown layers together. The first layer (i.e., layer 1) was a polybutylene terephthalate (PBT) meltblown fiber web with a basis weight of about 16 lb/ream (lb/f) and an air permeability of about 255 CFM, on a polyester scrim with a basis weight of about 8 lb/r and an air permeability of about 1,500 CFM. The second layer (i.e., layer 2) was a PBT meltblown fiber web having a basis weight of about 16 lb/r and an air permeability of about 160 CFM. The third layer (i.e., layer 3) was a PBT meltblown fiber web having a basis weight of about 20 lb/r and an air permeability of about 48 CFM. The surface of each layer was modified with 1H, 1H, 2H, 2H-perfluorooctyl acrylate using a chemical vapor deposition process.

The relative hydrophobicity of the PBT meltblown fiber webs were determined before and after surface modification using the isopropyl alcohol (IPA)/Water Rank test, as described herein. The droplet size was 10 µL, and the temperature was controlled to be between 60 to 80° F. The IPA/water rank was performed by, beginning with the lowest numbered test liquid (see Table 2), placing one drop of test liquid onto three locations on the surface of the surface modified meltblown fiber web. This process was repeated with higher numbered liquids until the highest number was reached that did not spread on or wick into the surface after 10 seconds. Surface modifying the PBT meltblown fiber webs increased the hydrophobicity of the fiber webs. The hydrophobicity of the PBT meltblown fiber web increased from an IPA/Water Rank of 3 to an IPA/Water Rank of 16 after surface modification.

The average and initial fuel water separation efficiencies of the filter media containing the three hydrophobic surface modified layers were determined using the SAE J1488 standard. The filter media was challenged with 2500 ppm of water which was emulsified in fuel using a pump to obtain a controlled droplet size distribution. The interfacial tension of the fuel-water mixture was 15 dynes/cm and the face velocity of the emulsified water-fuel mixture was 0.069 cm/s. The water content was measured both upstream and downstream of the media, via Karl Fischer titration. The efficiency was the amount of water removed from the water in fuel that is $1-[C/C_0]*100\%$ wherein C is the downstream water concentration and $C_0$ is the injected water concentration, which was 2500 ppm in this example. The total test time was 150 minutes. The initial efficiency was calculated at the first 10 min of the test and the average efficiency was calculated as the average of the efficiency at the end of 150 mins, as described herein. The water droplets in the fuel-water mixture were shed upstream and collected at the bottom of the housing. The initial efficiency was about 73% and the average efficiency was about 69%.

It is believed that the gradient in air permeability of hydrophobic surface modified layers helped shed water droplets 85 having different diameter distribution as schematically illustrated in FIG. 2. It is also believed that the larger droplets were drained upstream, where the air permeability and/or mean flow pore size was higher, and the smaller droplets drained downstream, where the air permeability and/or mean flow pore size was lower.

Example 2

This example describes a filter media as in FIG. 3 and Construct 2 of Table 1. The filter media was designed to coalesce water from a fuel-water mixture and contained three hydrophilic surface modified layers arranged such that the air permeability of the hydrophilic surface modified layers decreased from upstream to downstream. The surfaces of the layers were naturally hydrophobic and the surface modification altered the wettability, such that at least one surface of the each layer was hydrophilic. The filter media had a relatively high initial and average fuel-water separation efficiency and was able to coalesce water droplets with a variety of diameters and remove the droplets via gravity.

The filter media was formed using a protocol similar to that described in Example 1 except that surface of each layer was modified with acrylic acid.

The surface modification process changed the intrinsically hydrophobic PBT meltblown fiber web surface to a hydrophilic surface. The IPA/Water Rank Test was performed as described in Example 1 and the IPA/water rank changed from 3 to −1 after surface modification. An IPA/Water rank of −1 indicated that the water droplets spread and completely penetrated into the fiber web.

The filter media was tested for fuel-water separation efficiency as described in Example 1. The initial efficiency was about 68.4% and the average efficiency was about 68%. It is believed that the gradient in air permeability of the hydrophilic surface modified layers helped merge water droplets 95 of smaller sizes, as illustrated in FIG. 3, to become bigger drops that drained downstream of the filter media due to gravity.

Example 3

This example describes a filter media as in FIG. 4 and Construct 3 of Table 1. The surface modified layers from Example 1 and Example 2 were collated together to form a single filter medium. The filter media were arranged such that the hydrophobic surface modified layers were upstream and the hydrophilic surface modified layers were downstream. The trend in air permeability of the hydrophobic and hydrophilic surface modified layers were the same as in Example 1 and Example 2. The advantage of this configuration was that both coalescing and shedding took place in a single filter media stage.

The filter media was tested for fuel water separation efficiency as described in Example 1. The initial efficiency was about 77% and the average efficiency was about 74%. Water droplets 135 were collected both on the upstream and downstream side. It is believed that larger droplets are shed upstream at the hydrophobic surface modified layers, as illustrated in FIG. 4, and then the droplets that are not shed by the hydrophobic surface modified layers are coalesced at the hydrophilic surface modified layers to form larger droplets that drained due to gravity.

Example 4

This example describes a filter media as in FIG. 5 and Construct 4 of Table 1. The hydrophobic surface modified layers from Example 1 were placed in a downstream stage and the hydrophilic surface modified layers from Example 2 were placed in an upstream stage. The trend in air permeability of the hydrophobic and hydrophilic surface modified layers were the same as in Example 1 and Example 2. An advantage of this configuration was that very small water droplets (e.g., less than about 10 microns), which were too small to be removed by the shedding stage (i.e., the stage comprising the hydrophobic surface modified filter media) alone, were coalesced into droplets that had the requisite size to be removed by the coalescing stage (i.e., the stage comprising the hydrophilic surface modified layers).

The filter media was tested for fuel-water separation efficiency as described in Example 1. In this dual stage system, as illustrated in FIG. 5, it is believed that water droplet 175 drainage primarily occurred downstream of the coalescing stage, and that water drainage also occurred between the coalescing and shedding stages. The initial efficiency was about 70% and the average efficiency was about 68% for the dual stage media.

Example 5

This example describes a filter media as in FIG. 6 and Construct 5 of Table 1. The filter media was designed to coalesce water from a fuel-water mixture and contained two hydrophobic surface modified layers and one hydrophilic surface modified layer arranged such that the hydrophilic surface modified layer was positioned between the two hydrophobic surface modified layers. The filter media was formed by collating three surface modified meltblown layers together. The first layer (i.e., layer 1) was a PBT meltblown fiber web having a basis weight of about 16 lb/r and an air permeability of about 255 CFM on a polyester scrim having a basis weight of about 8 lb/r and an air permeability of about 1,500 CFM. The second layer (i.e., layer 2) and the third layer (i.e., layer 3) were PBT meltblown fiber webs having a basis weight of about 20 lb/r and an air permeability of about 48 CFM. At least one surface of the first and the third layers was modified to be hydrophobic as described in Example 1. A surface of the second layer was modified to be hydrophilic as described in Example 2, except helium was used as a carrier gas for the acrylic acid.

The filter media was tested for fuel-water separation efficiency as described in Example 1. In this arrangement, the upstream hydrophobic surface modified layer repelled and removed hydrophilic droplets having a relatively large diameter, such that the relatively large droplets did not interfere with coalescence of droplets having a relatively small diameter at the intermediate hydrophilic surface modified layer. The downstream hydrophilic layer served to repel and remove the droplets that were coalesced at the intermediate hydrophilic layer. It is believed that the water droplets 230 primarily drained at the surfaces of layers 1 and 3, as illustrated in FIG. 6, and that water droplets also drained between layers 1 and 2. The initial efficiency of the filter media was 75% and the average efficiency was 68%.

Example 6

This example describes a dual stage filter arrangement as in FIG. 7 and Construct 6 of Table 1. The filter arrangement contained an upstream hydrophobic surface modified layer and a downstream filter media comprising a hydrophilic surface modified layer and a hydrophobic surface modified layer. The filter was arranged such that the hydrophilic surface modified layer was between the hydrophobic surface modified layers. An advantage of this configuration was that larger droplets (e.g., greater than 10 micron, about 30 microns, about 60 microns) were shed upstream prior to reaching the downstream stage. At the downstream stage the remaining smaller droplets were coalesced and shed at the hydrophilic and hydrophobic surface modified layers, respectively.

The filter arrangement included three surface modified meltblown layers placed together. The first layer (i.e., layer 1) was a PBT meltblown fiber web with a basis weight between about 10-50 lb/r and an air permeability between about 30-200 CFM on a polyester scrim having a basis weight of about 8 lb/r and an air permeability of about 1,500 CFM. The second layer (i.e., layer 2) and the third layer (i.e., layer 3) were PBT meltblown fiber webs having a basis weight between about 10-30 lb/r and an air permeability between about 1-100 CFM. At least one surface of the first and the third layers was modified to be hydrophobic as described in Example 1. A surface of the second layer was modified to be hydrophilic as described in Example 2.

It is expected that in this configuration, the water droplets 225 would primarily drained at the surfaces of layers 1 and 3, as illustrated in FIG. 7. However, water droplets may also be drained between layers 2 and 3.

Example 7

This example describes a dual stage filter arrangement as in FIG. 8 and Construct 7 of Table 1. The filter arrangement contained an upstream hydrophilic surface modified layer and a downstream hydrophobic surface modified layer. An advantage of this configuration was that very small water droplets (e.g., less than about 10 microns), which were too small to be removed by the hydrophobic surface modified filter media alone, were coalesced into droplets that had the requisite size to be removed.

The filter arrangement included two surface modified meltblown layers placed together. The first layer (i.e., layer 1) was a PBT meltblown fiber web with a basis weight between about 5-100 lb/r and an air permeability between about 20-200 CFM on a polyester scrim having a basis weight of about 8 lb/r and an air permeability of about 1,500 CFM. The second layer (i.e., layer 2) was a PBT meltblown fiber webs having a basis weight between about 5-100 lb/r and an air permeability between about 1-100 CFM. A surface of the second layer was modified to be hydrophilic as described in Example 2. A surface of the first layer was modified to by hydrophobic as described in Example 1.

It is expected that in this configuration, water droplets 275 would primarily drain at the surface of layer 2, as illustrated in FIG. 8. However, water droplets may also be drained between layers 1 and 2.

Example 8

This example describes a dual stage filter arrangement as in Example 7, except the downstream stage comprised a hydrophilic surface modified layer and a hydrophobic surface modified layer. The filter was arranged such that the two hydrophilic surface modified layers were upstream of the hydrophobic surface modified layer. An advantage of this configuration was that very small water droplets (e.g., less than about 10 microns), which were too small to be removed by the hydrophobic surface modified layer alone, were coalesced by two hydrophilic surface modified layers into droplets that had the requisite size to be removed.

It is expected that in this configuration, the water droplets 300 would primarily drain at the surface of layer 3, as illustrated in FIG. 9.

Example 9

This example describes a filter media as in FIG. 10 and Construct 9 of Table 1. The filter media was designed to remove water from a fuel-water mixture and contained a dual phase synthetic and cellulose fiber web having a hydrophilic surface modification. The filter media had a relatively high initial and average fuel:water separation efficiency and was able to coalesce water droplets at the upstream side and the downstream of the dual phase media.

The dual phase filter media was formed on a fourdrinier with a secondary headbox. The dual phase media had a bottom phase made of cellulose, acrylic resin and polyester fibers and a top layer made of fibrillated Lyocell fibers. The dual phase filter media having a basis weight of about 100 lb/r and an air permeability of about 2 CFM was coated with acrylic acid using chemical vapor deposition.

The surface modification process changed the intrinsically hydrophobic fiber web surface to a hydrophilic surface. The IPA/Water Rank Test was performed as described in Example 1 and the IPA/water rank changed from 3 to −1 after surface modification. An IPA/Water rank of −1 indicated that the water droplets spread and completely penetrated into the fiber web.

The filter media was tested for fuel-water separation efficiency as described in Example 1. The initial and average efficiency was about 51%. The hydrophilic surface modified dual phase filter media helped merge water droplets 315 of smaller sizes, as illustrated in FIG. 10, to become bigger drops that drained due to gravity.

Example 10

This example describes a filter media as in FIG. 11 and Construct 10 of Table 1. The filter media was designed to shed water from a fuel-water mixture and contained a dual phase synthetic and cellulose fiber web having a hydrophobic surface modification. The filter media, alone, had a relatively high initial and average fuel-water separation efficiency and was able to shed water droplets on the upstream side of the dual phase media and coalesce on the downstream side of the dual phase media. In some instances, dual phase media may be advantageous because the average fiber diameter, roughness and density gradient across the dual phase media's cross-section promote longer life of the media, and/or the main filter and prefilter may be in one media.

The dual phase filter media was formed as described in Example 9. The dual phase media was coated with 1H,1H, 2H,2H-perfluorooctyl acrylate using chemical vapor deposition.

The surface modification process enhanced the intrinsically hydrophobic fiber web surface. The IPA/Water Rank Test was performed as described in Example 1 and the IPA/water rank changed from 3 to 6 after surface modification.

The filter media was tested for fuel:water separation efficiency as described in Example 1. The initial water separation efficiency was 61.7% and average water separation efficiency was about 53%. The hydrophilic surface modified dual phase filter media shed water droplets 355 of a variety of diameters, as illustrated in FIG. 11.

While the examples only have one or two stages, by adding additional stages and/or layers of media (e.g., multiple alternating hydrophobic and hydrophilic stages and/or layers) and controlling the pore size, basis weight, thickness, and/or surface chemistries of the layers and/or stages, higher efficiencies can be expected.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A filter media comprising:
a non-woven web, comprising:
a first layer having a hydrophobic surface,
wherein the first layer has a basis weight between 0.1 g/m$^2$ and 100 g/m$^2$, a thickness between 0.05 mm and 3 mm, and an air permeability between 0.3 CFM and 800 CFM;
a second layer having a hydrophobic surface,
wherein the second layer has a basis weight between 0.1 g/m$^2$ and 100 g/m$^2$, a thickness between 0.05 mm and 3 mm, and an air permeability between 0.3 CFM and 800 CFM, and wherein the air permeability of the second layer is different from an air permeability of the first layer; and
a third layer, where a surface of the third layer is coated with a hydrophilic material,
wherein the third layer has a basis weight between 0.1 g/m$^2$ and 100 g/m$^2$, a thickness between 0.05 mm and 3 mm, and an air permeability between 0.3 CFM and 800 CFM.

2. A filter media comprising:
a non-woven web, comprising:
a first layer having a hydrophilic surface,
wherein the first layer has a basis weight between 0.1 g/m$^2$ and 100 g/m$^2$, a thickness between 0.05 mm and 3 mm, and an air permeability between 0.3 CFM and 800 CFM;
a second layer having a hydrophilic surface,
wherein the second layer has a basis weight between 0.1 g/m$^2$ and 100 g/m$^2$, a thickness between 0.05 mm and 3 mm, and an air permeability between 0.3 CFM and 800 CFM,
wherein a surface of at least one of the first and second layers is coated with a hydrophilic material,
and wherein the air permeability of the second layer is different from the air permeability of the first layer; and
a third layer having a hydrophobic surface,
wherein the third layer has a basis weight between 0.1 g/m$^2$ and 100 g/m$^2$, a thickness between 0.05 mm and 3 mm, and an air permeability between 0.3 CFM and 800 CFM.

3. The filter media of claim 2, wherein the hydrophobic surface comprises a hydrophobic material comprising an organic material.

4. The filter media of claim 2, wherein the hydrophobic surface comprises a hydrophilic material comprising a small organic molecule.

5. The filter media of claim 1, wherein the surface of the first layer is coated with a hydrophobic material.

6. The filter media of claim 1, wherein the surface of the third layer is coated with a hydrophobic material.

7. The filter media of claim 2, wherein the air permeability of the first layer is greater than the air permeability of the second layer.

8. The filter media of claim 2, wherein the first layer is positioned between the second and third layers.

9. The filter media of claim 1, wherein the third layer is positioned between the first and the second layers.

10. The filter media of claim 2, wherein the second layer is positioned between the first and third layers.

11. The filter media of claim 2, wherein the hydrophobic surface has a water contact angle of greater than or equal to about 105 degrees.

12. The filter media of claim 2, wherein the hydrophobic surface has a water contact angle of greater than or equal to about 120 degrees.

13. The filter media of claim 2, wherein the hydrophilic surface of each of the first layer and the second layer has a water contact angle of less than or equal to about 75 degrees.

14. The filter media of claim 2, wherein the hydrophilic surface of each of the first layer and the second layer has a water contact angle of less than or equal to about 60 degrees.

15. The filter media of claim 2, wherein the mean flow pore size of the first layer is greater than the mean flow pore size of the second layer.

16. The filter media of claim 2, wherein the first layer is upstream of the second layer.

17. The filter media of claim 2, wherein the hydrophilic material is charged.

18. The filter media of claim 2 having an average fuel-water separation efficiency of at least 50%.

19. The filter media of claim 2 having an average fuel-water separation efficiency of at least 70%.

20. The filter media of claim 11, wherein the hydrophilic surface of each of the first layer and the second layer has a water contact angle of less than or equal to about 75 degrees.

21. The filter media of claim 2, wherein at least a portion of an interior of at least one of the first and second layers is coated with the hydrophilic material.

22. The filter media of claim 2, wherein the hydrophilic material is selected from the group consisting of polyelectrolytes, oligomers, polymers, small molecules, ionic liquids, monomer precursors, metals, gases, and combinations thereof.

\* \* \* \* \*